US011210720B2

(12) United States Patent
Ono et al.

(10) Patent No.: US 11,210,720 B2
(45) Date of Patent: Dec. 28, 2021

(54) SERVER APPARATUS, METHOD, AND COMPUTER PROGRAM PRODUCT

(71) Applicants: Hiroaki Ono, Kanagawa (JP); Masaaki Horikoshi, Tokyo (JP); Shukoh Chin, Kanagawa (JP)

(72) Inventors: Hiroaki Ono, Kanagawa (JP); Masaaki Horikoshi, Tokyo (JP); Shukoh Chin, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 398 days.

(21) Appl. No.: 15/471,026

(22) Filed: Mar. 28, 2017

(65) Prior Publication Data

US 2017/0287047 A1 Oct. 5, 2017

(30) Foreign Application Priority Data

Mar. 30, 2016 (JP) .............................. JP2016-068331

(51) Int. Cl.
*G06Q 30/00* (2012.01)
*G06Q 30/06* (2012.01)
*G06Q 30/02* (2012.01)

(52) U.S. Cl.
CPC ....... *G06Q 30/0631* (2013.01); *G06Q 30/016* (2013.01); *G06Q 30/02* (2013.01)

(58) Field of Classification Search
CPC ... G06Q 30/0631; G06Q 30/02; G06Q 30/016
(Continued)

(56) References Cited

U.S. PATENT DOCUMENTS

2004/0039624 A1 2/2004 Ikezawa et al.
2006/0053023 A1 3/2006 Matsunaga et al.
(Continued)

FOREIGN PATENT DOCUMENTS

JP 2004-054304 2/2004
JP 2008-512732 4/2008
(Continued)

OTHER PUBLICATIONS

G. Dziczkowski, K. Wegrzyn-Wolska and L. Bougueroua, "An opinion mining approach for web user identification and clients' behaviour analysis," 2013 Fifth International Conference on Computational Aspects of Social Networks, 2013, pp. 79-84, doi: 10.1109/CASoN.2013.6622605. (Year: 2013).*
(Continued)

*Primary Examiner* — Anand Loharikar
(74) *Attorney, Agent, or Firm* — IPUSA, PLLC

(57) ABSTRACT

A server apparatus includes a storage unit that stores a proposal condition for proposing a product pertaining to a usage of an object and product information indicating the product. The proposal condition is stored in association to the product information. The server apparatus further includes a determination unit that determines whether one or more target management objects satisfy the proposal condition based on a first collection information including information pertaining to the one or more target management objects, and an output unit that outputs information indicating the one or more target management objects and the product information stored in association to the proposal condition when the one or more target management objects satisfy the proposal condition.

8 Claims, 17 Drawing Sheets

(58) Field of Classification Search
USPC ............................................... 705/26.1–27.2
See application file for complete search history.

(56) References Cited

U.S. PATENT DOCUMENTS

2008/0133211 A1* 6/2008 Dombrowski ......... G06Q 30/06
  703/22
2013/0179256 A1 7/2013 Farrell et al.

FOREIGN PATENT DOCUMENTS

| JP | 2010-218062 | 9/2010 |
| JP | 2015-509243 | 3/2015 |

OTHER PUBLICATIONS

Japanese Office Action for 2016-068331 dated Dec. 3, 2019.

* cited by examiner

FIG.7

| APPLI-CATION ID | PROPOSAL CONDITION INFORMATION ||| EFFECT INFORMATION |
|---|---|---|---|
| | CHARACTERISTIC PHENOMENON | LANGUAGE CONVERSION INFORMATION | |
| ID001 | AMOUNT OF FAX RECEPTION INCREASING | ·COMMUNICATION INSIDE/OUTSIDE COMPANY PERFORMED BY FAX<br>·PROPOSING DIGITALIZATION FOR DOCUMENT STORAGE EFFECTIVE | EFFECT OF REDUCING MONTHLY PRINTING SHEETS: XX SHEETS |
| | SCANNER BEING USED, 1 SET COPIED FREQUENTLY | ·1 SET COPIED POSSIBLY FOR DOCUMENT STORAGE<br>·PROPOSING DOCUMENT STORAGE BY DIGITALIZATION EFFECTIVE | EFFECT OF REDUCING MONTHLY PRINTING SHEETS: YY SHEETS |
| | SCANNER USED FREQUENTLY | ·SCANNING PERFORMED FREQUENTLY, POSSIBLY A LARGE AMOUNT OF PAPER DOCUMENTS DIGITALIZED AND STORED<br>·PROPOSING DOCUMENT STORAGE BY DIGITALIZATION EFFECTIVE | EFFECT OF REDUCING MONTHLY PRINTING SHEETS: ZZ SHEETS |
| ID002 | LARGE AMOUNT OF TOTAL OUTPUT AND COLOR OUTPUT BY PRINTER | ·A SINGLE ERROR WILL INCREASE COST DUE TO LARGE AMOUNT OF COLOR OUTPUT<br>·PROPOSING PREVENTION OF PRINTING ERROR FOR COST REDUCTION | EFFECT OF REDUCING MONTHLY PRINTING COST: xx YEN |
| | 2 in 1 AGGREGATE FUNCTION OF PRINTER USED FREQUENTLY | ·CUSTOMER PROBABLY COST CONSCIOUS<br>·PROPOSING PREVENTION OF PRINTING ERROR FOR COST REDUCTION | EFFECT OF REDUCING MONTHLY PRINTING COST: yy YEN |
| | ⋮ | ⋮ | ⋮ |
| ID003 | ⋮ | ⋮ | ⋮ |

| ADDITIONAL APPLICATION INFORMATION | | | |
|---|---|---|---|
| APPLICATION ID | APPLICATION NAME | COMPATIBLE MODEL | FUNCTION DESCRIPTION FILE |
| ID001 | APPLICATION I | S2, S4 | File001 |
| ID002 | APPLICATION II | S3 | File002 |
| ID003 | APPLICATION III | S4 | File003 |

FIG.17

| OBTAIN SHEET | DATE OF REPORT | CUSTOMER NAME | OFFICE NAME | DEVICE ID | MODEL | | | |
|---|---|---|---|---|---|---|---|---|
| ✓ | 2015/12/01 12:00 | CUSTOMER A | HEAD OFFICE | MFP001 | S1 | | | |
| ✓ | 2015/12/01 12:00 | CUSTOMER B | HEAD OFFICE | MFP021 | S2 | | | |
| | | | | | | | | |
| | | | | | | | | |
| | | | | | | | | |
| | | | | | | | | |
| | | | | | | | | |

NAME OF SALES PERSON: .....

1700

SERVER APPARATUS, METHOD, AND COMPUTER PROGRAM PRODUCT

BACKGROUND OF THE INVENTION

1. Field of the Invention

The present invention relates to a server apparatus, a method, and a computer program product.

2. Description of the Related Art

Generally, a manager (e.g., sales person, repair person) continues to manage a machine such as an image forming apparatus even after the machine has been delivered to the customer. After a certain period of time elapses, the manager proposes replacing the machine with a newest model of the machine to the customer.

In sales activity, it is important for the manager to propose an appropriate model that satisfies the needs of the customer at the time of replacing the machine. For example, Japanese Laid-Open Patent Publication No. 2004-54304 teaches a configuration that provides the manager with information necessary for proposing the appropriate model.

Meanwhile, changes such as the customer's usage status of the machine may occur after the machine is purchased. In this case, the manager would propose adding a new function to the machine (e.g., installing a new application) to the customer. By providing an additional product pertaining to the use of the machine (e.g., application), the manager can flexibly respond to the changes of the customer's usage status of the machine.

Therefore, not only is proposing the appropriate management object (machine) important for the sales activity of the manager but proposing the appropriate additional product pertaining to the management object (e.g., additional application) is also important. Thus, a technology for supporting the manager in proposing the appropriate machine/additional application is desired.

SUMMARY OF THE INVENTION

The present invention may provide a server apparatus, a method, and a computer program product that substantially obviate one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by a server apparatus, a method, and a computer program product particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides a server apparatus including a storage unit that stores a proposal condition for proposing a product pertaining to a usage of an object and product information indicating the product. The proposal condition is stored in association to the product information. The server apparatus further includes a determination unit that determines whether one or more target management objects satisfy the proposal condition based on a first collection information including information pertaining to the one or more target management objects, and an output unit that outputs information indicating the one or more target management objects and the product information stored in association to the proposal condition when the one or more target management objects satisfy the proposal condition.

Other objects, features and advantages of the present invention will become more apparent from the following detailed description when read in conjunction with the accompanying drawings.

BRIEF DESCRIPTION OF THE DRAWINGS

FIG. 7 is a schematic diagram illustrating proposal condition information according to an embodiment of the present invention;

FIG. 9 is a schematic diagram illustrating additional application information according to an embodiment of the present invention;

FIG. 17 is a schematic diagram illustrating a list of image forming apparatuses generated by a reporting part according to an embodiment of the present invention.

DETAILED DESCRIPTION OF THE PREFERRED EMBODIMENTS

Figure 1:
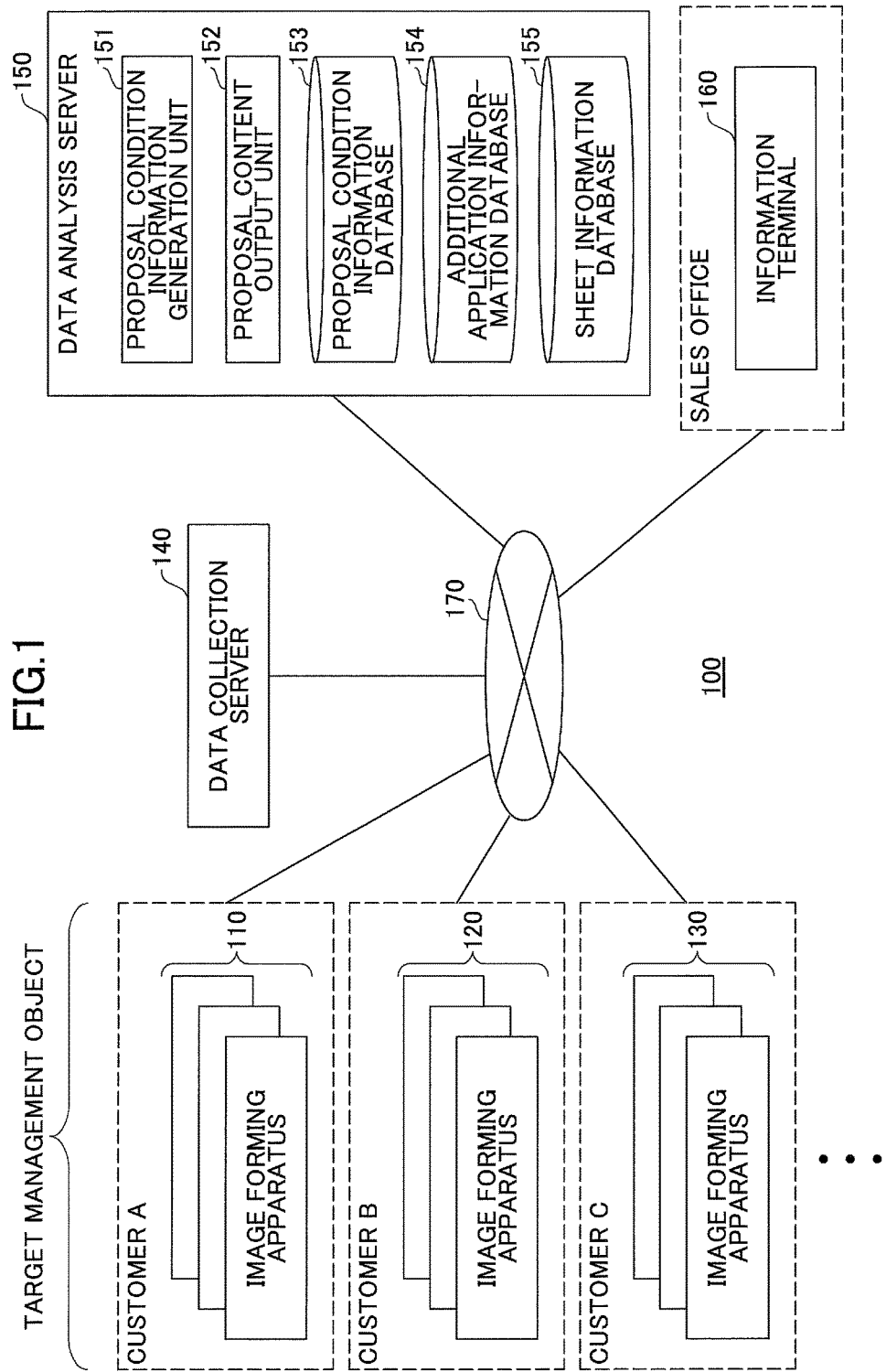
FIG. 1 is a schematic diagram illustrating an overall configuration of a support system according to an embodiment of the present invention.

First, an overview of the embodiments of the present invention is described. According to each of the embodiments, in a case where a manager proposes to supply an additional product pertaining to the use of an object to a customer, a server apparatus identifies a suitable object from the objects managed by the manager. The suitable object is an object suitable for being supplied as an additional product pertaining to the use of the object. Further, the server apparatus further identifies a suitable product from the additional products pertaining to the use of the objects managed by the manager. The suitable product is a product suitable for being supplied as an additional product to the identified object. Further, the server apparatus associates information indicating the identified object to information indicating the additional product pertaining to the identified object. Then, the server apparatus reports the associated information to the manager.

Thereby, the manager not only can recognize a product to be proposed as an additional product pertaining to the use of an object but can also recognize an object suitable for providing the product.

As a result, the manager can make an appropriate proposal during sales activity of the additional product pertaining to the use of an object. That is, the manager's sales activity for an additional product pertaining to the use of the object can be supported.

Next, embodiments of the present invention are described with reference to the accompanying drawings. Throughout the description of the embodiments and the drawings, like parts and components are denoted with like reference numerals and are not redundantly explained.

First Embodiment

In the below-described embodiments of the present invention, an object that is managed is also hereinafter referred to as "target management object". In the below-described embodiments, the target management object is an image forming apparatus such as a Multi-Function Peripheral (MFP) including, for example, a copier function, a printer function, a facsimile function, and a scanner function. Further, according to the first embodiment, an additional product pertaining to the use of the target management object is referred to as an "additional application" for adding a new function to the image forming apparatus. Other examples of the object may be an office machine (e.g., projector, an electronic blackboard), a vehicle, a mobile phone, a health care product (e.g., weight scale, body composition meter), or an insurance product.

<1. Overall Configuration of Support System>

First, an overall configuration of a support system 100 is described. The support system 100 is for supporting the sales activity of a manager (in this embodiment, sales person). FIG. 1 is a schematic diagram illustrating the overall configuration of the support system 100 according to the first embodiment of the present invention.

As illustrated in FIG. 1, the support system 100 of the first embodiment includes multiple image forming apparatuses (image forming apparatus groups 110, 120, 130, . . . ) that are managed by the sales person. Further, the support system 100 includes a data collection server 140, a data analysis server 150, and an information terminal 160.

In the support system 100 of the first embodiment, the multiple image forming apparatuses included in each of the image forming apparatus groups 110, 120, 130, . . . are communicably connected to the data collection server 140 via a network 170. Similarly, the data analysis server 150, the data collection server 140, and the information terminal 160 are communicably connected to each other via the network 170.

Each of the image forming apparatus groups 110, 120, 130, . . . is owned by customers A, B, C, . . . .

The data collection server 140 is a server apparatus that collects arbitrary data pertaining to each of the image forming apparatuses managed by the sales person. Note that the arbitrary information pertaining to each image forming apparatus collected by the data collection server 140 is also hereinafter referred to as "collection information".

The data analysis server 150 is a server apparatus that analyzes the collection information collected by the data collection server 140. A proposal condition information generation program and a proposal content output program are installed in the data analysis server 150. By the execution of the proposal condition information generation program and the proposal content output program, the data analysis server 150 functions as a proposal condition information generation unit 151 and a proposal content output unit 152. Further, the data analysis server 150 includes a proposal condition information database 153, an additional application information database 154, and a sheet information database 155.

The information terminal is a terminal operated by the sales person. The information terminal is placed in, for example, a sales office to which the sales person belongs. Alternatively, the information terminal 160 may be a portable type terminal. The information terminal 160 has a configuration enabling the information terminal 160 to access the sheet information database 155 of the data analysis server 150.

In the example illustrated in FIG. 1, each of the data collection server 140 and the data analysis server 150 is illustrated as a single server apparatus. Alternatively, each of the data collection server 140 and the data analysis server 150 may be a server system including multiple server apparatuses.

For the sake of convenience, the example of FIG. 1 only illustrates a single information terminal 160 of a certain sales person belonging to a certain sales office. However, multiple sales offices and sales personnel may exist in the support system 100 in which information terminals are operated by the multiple sales personnel.

<2. Overview of Functions Implemented by Support System>

Next, an overview of the functions implemented by the support system 100 is described. According to the support system 100, an additional application suitable for being installed in the image forming apparatus is identified based on the collection information pertaining to a target management object. Further, an image forming apparatus suitable for installing the identified additional application is identified based on the collection information pertaining to the target management object.

Further, according to the support system 100, the additional application suitable for being installed in the image forming apparatus and the image forming apparatus suitable for installing the additional application are reported to the sales person. Further, according to the support system 100, reference material used for proposing the installment of the additional application to the customer is generated and provided to the sales person. Note that the reference material used for proposing the installment of the additional application to the customer is also hereinafter referred to as a "sheet".

Accordingly, the sale person can propose a suitable additional application to the customer by using the above-described functions implemented by the support system 100. Further, at the time of replacing an image forming apparatus with a newest model of the image forming apparatus, the sales person can propose an additional application suitable for installing to the newest model of the image forming apparatus. In other words, the support system 100 can support a manager's (sales person's) sales activity in proposing an additional application.

Figure 2:
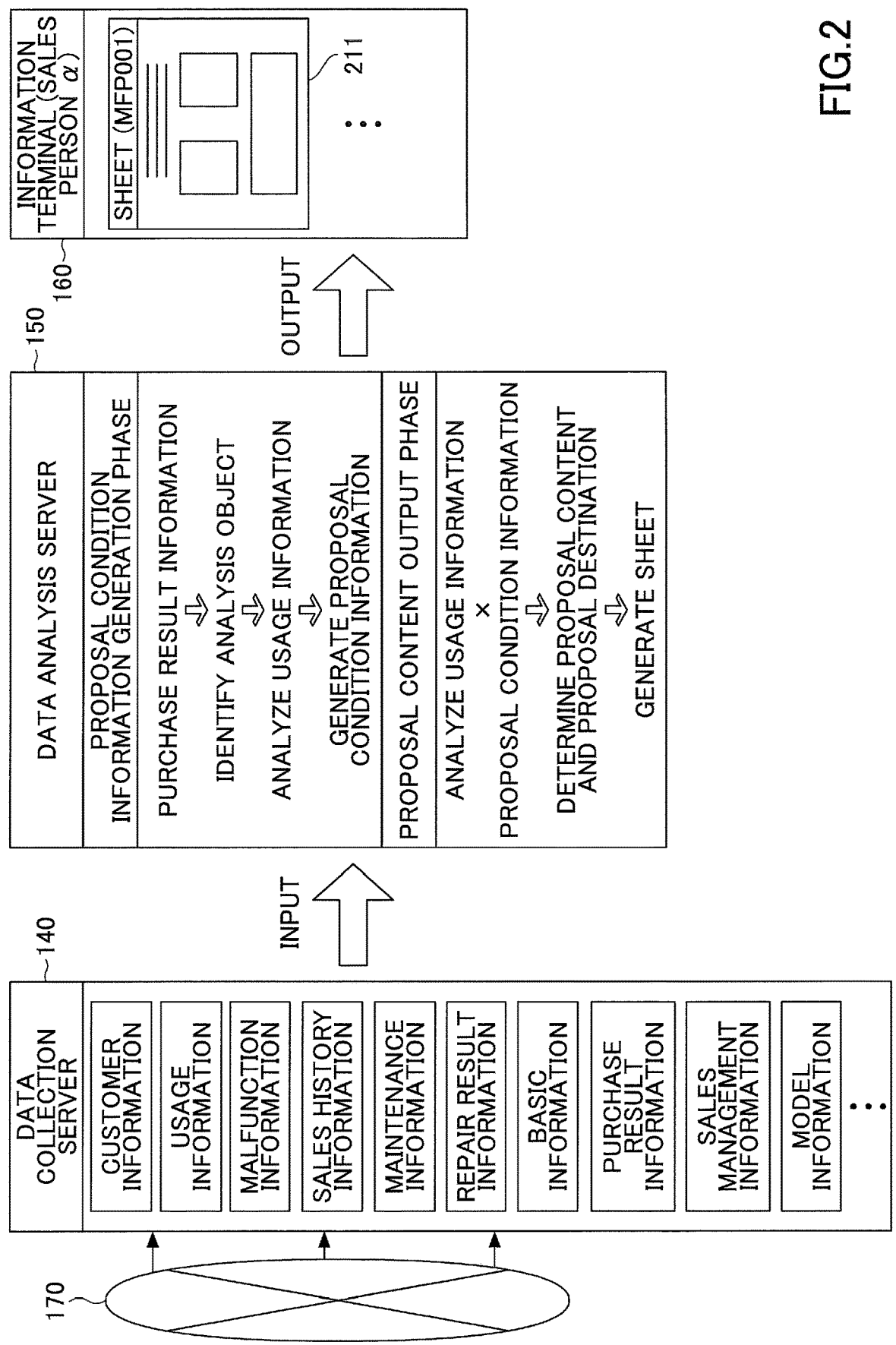
FIG. 2 is a schematic diagram illustrating the functions implemented by a support system according to an embodiment of the present invention.

FIG. 2 is a schematic diagram illustrating the functions implemented by the support system according to an embodiment of the present invention. As illustrated in FIG. 2, the data collection server 140 collects collection information pertaining to the one or more image forming apparatuses that are managed (target management objects). The collection information collected by the data collection server 140 includes, for example, customer information, usage information, malfunction information, sales history information, maintenance information, repair result information, basic information, purchase result information, sales management information, and model information.

The customer information includes various information from generation information of the customer to financial status information of the customer. The generation information of the customer includes, for example, the customer's name and location (address), the size of business, and the number of employees. The financial status information of the customer includes, for example, information indicating sales and information indicating ordinary profit.

The usage information includes information pertaining to the usage results of the image forming apparatus. For example, the usage information includes the number of sheets copied, the number of sheets copied in two colors, the number of sheets printed, the number of sheets printed in two colors, the number of times receiving FAX data, the number of times transmitting FAX data, and the number of times of inputting data by scanning. The information pertaining to the usage results is collected from, for example, data of the results obtained each month for a certain period.

The malfunction information includes, for example, information pertaining to malfunction results of the image forming apparatus, and information pertaining to paper-jam. The information pertaining to the malfunction information is collected from, for example, data of the results obtained each month for a certain period. Further, the information pertaining to paper-jam is collected from statistic data that are categorized according to, for example, the location in which paper-jam occurred and the period of time in which the paper-jam.

The sales history information includes arbitrary information pertaining to the sales results of the sales person. For example, the sales history information includes the time/date or the number of times in which the sales person visited the customer, the length of time in which the sales person interviewed the customer, the time/date or the number of times in which the sales person spoke to the customer on the telephone, and the length of time in which the sales person spoke to the customer with a telephone or the like.

The maintenance information includes arbitrary information pertaining to the maintenance of the image forming apparatus. For example, the maintenance information includes the time/date or the number of times in which the maintenance person performed maintenance on the image forming apparatus.

The repair result information includes arbitrary information pertaining to the repairmen of the image forming apparatus. For example, the repair result information includes information indicating the time that was needed for the maintenance person to repair a malfunctioned image forming apparatus, or information pertaining to a component that was replaced.

The basic information includes, for example, the customer's name (customer A, B, C, . . . ), the name of the office of the customer, the location (address) of the office, the date of installing each image forming apparatus, and the device ID of the image forming apparatus to be installed. Further, the basic information may also include arbitrary information that is determined when installing the image forming apparatus such as the type of purchase (e.g., rental or purchased), the type of contract (e.g., whether a maintenance contract is included, and the method of billing (fixed rate or measured rate)).

The purchase result information includes the purchase results of the image forming apparatus with respect to each customer (customer A, B, C, . . . ). The purchase results includes, for example, the device ID, the model (type) of image forming apparatus, the additional application, the date of purchase, the device ID and the type of a previous image forming apparatus used before the purchase of the image forming apparatus. The purchase result information not only includes the purchase results pertaining to the image forming apparatus but also includes, for example, the purchase results of an optional product (e.g., a finisher, a data management server, an authentication apparatus) or the purchase results of other office devices (e.g., a projector, an electronic blackboard, video conference terminal).

The sales management information includes, for example, information illustrating the relationship between the sales person, the image forming apparatus managed by the sales person, and the customer using the image forming apparatus.

The model information includes, for example, information pertaining to the performance of every model (type) of image forming apparatus managed by the sales person.

Note that the collection information illustrated in FIG. 2 is merely an example of information collected by the data collection server 140. The data collection server 140 may collect information other than the above-described collection information. It is, however, preferable for the data collection server 140 to collect information pertaining to the financial status of the customer, information pertaining to the importance of the image forming apparatus, and information pertaining to the brand royalty of the image forming apparatus. This is because collecting such information is effective when determining the customer for making a proposal (proposal target).

For example, even in a case where there is a need to install an additional application to the image forming apparatus owned by the customer, the possibility for the customer to purchase the additional application will decrease if the customer is in a financial state unable to make a capital investment. Further, even in a case where the malfunction frequency of the image forming apparatus increases and the image forming apparatus is disabled for a long time, the possibility that an additional application will be purchased by the customer becomes high if the image forming apparatus is essential for the customer to continue business. However, if the importance of the image forming apparatus is low, the possibility that an additional application be purchased by the customer would not increase. Further, if the royalty of the image forming apparatus is high and the customer continues to use the image forming apparatus managed by the sales person, the possibility that an additional application be purchased by the customer is high. In contrast, if the royalty of the image forming apparatus is low, the customer is likely to purchase an image forming apparatus of another company and refrain from purchasing the additional application.

The data analysis server 150 performs various processes by using the collection information collected by the data collection server 140. The processes performed by the data analysis server 150 can be largely categorized into two phases. One phase includes processes performed by the proposal condition information generation unit 151, and the other phase includes processes performed by the proposal content output unit 152.

Note that the term "proposal condition" is a condition for determining whether to propose that an additional application be installed to the image forming apparatus. In the first embodiment, the data analysis server 150 analyzes the collection information (mainly, usage information) pertaining to an image forming apparatus to be analyzed (image forming apparatus already having purchased and installed with an additional application, hereinafter also referred to as "target analysis object") and obtains a characteristic phenomenon related to the purchasing of the additional application. The characteristic phenomenon obtained by the data analysis server 150 is used as the proposal condition.

In the proposal condition information generation phase, the data analysis server 150 identifies an image forming apparatus to be analyzed (image forming apparatus already having purchased and installed with an additional application) from the image forming apparatuses that are being managed. The data analysis server 150 identifies the image forming apparatus to be analyzed (target analysis object) based on the purchase result information included in the collection information.

Further, the data analysis server 150 obtains the proposal condition by analyzing the collection information (mainly, usage information) pertaining to the identified image forming apparatus to be analyzed. Further, the data analysis server 150 generates proposal condition information including the obtained proposal condition.

In the proposal content output phase, the data analysis server 150 recognizes a characteristic phenomenon by analyzing the collection information (mainly, usage information) pertaining to the image forming apparatus that is being managed (managed image forming apparatus). Further, the data analysis server 150 determines whether the recognized characteristic phenomenon matches the proposal condition included in the proposal condition information.

In a case where the data analysis server 150 determines that the characteristic phenomenon matches the proposal condition, the data analysis server 150 determines that the additional application stored in association with the proposal condition is the proposal content, and determines the customer owning the managed image forming apparatus to be the proposal target. Further, the data analysis server 150 generates a sheet including the determined proposal content and the proposal target.

When a sheet 211 is generated by the data analysis server 150, the sales person a reads out the sheet 211 by accessing the data analysis server 150 via the information terminal 160 and outputs the sheet 211. Thereby, the sales person a can perform sales activity by using the sheet 211 including the proposal content and the proposal target.

<3. Hardware Configuration of Data Analysis Server>

Figure 3:
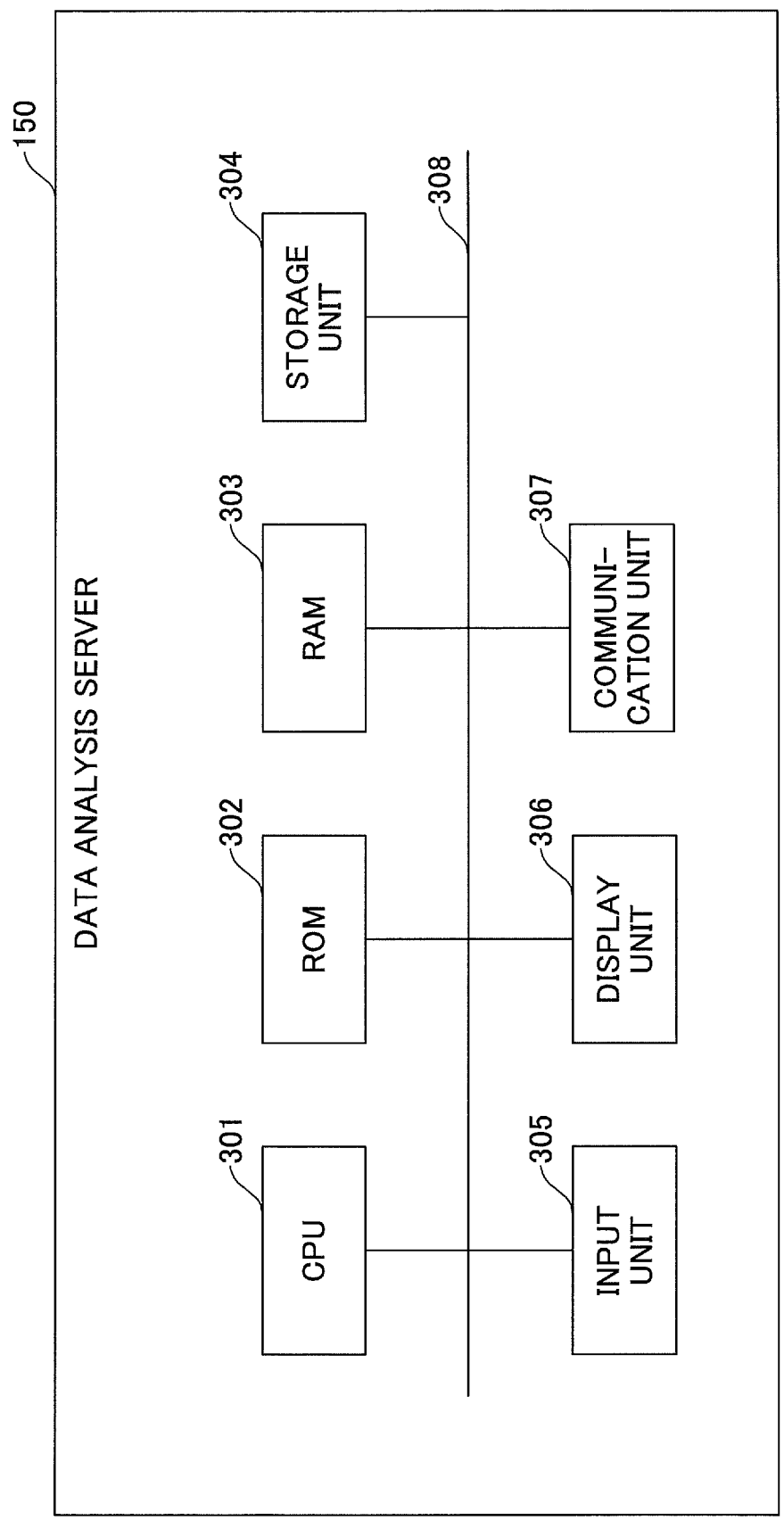
FIG. 3 is a schematic diagram illustrating a hardware configuration of a data analysis server according to an embodiment of the present invention.

Next, a hardware configuration of the data analysis server 150 is described. FIG. 3 is a schematic diagram illustrating the hardware configuration of the data analysis server 150 according to the first embodiment of the present invention.

As illustrated in FIG. 3, the data analysis server 150 includes a CPU (Central Processing Unit) 301, a ROM (Read Only Memory) 302, a RAM (Random Access Memory) 303, and a storage unit 304. Further, an input unit 305, a display unit 306, and a communication unit 307 are included in the data analysis server 150. The components and units included in the data analysis server 150 are connected to each other via a bus 308.

The CPU 301 is a computer that executes various program (e.g., proposal condition information generation program, proposal content output program) stored in the storage unit 304.

The ROM 302 is a non-volatile memory. The ROM 302 stores, for example, various programs and data required for enabling the CPU 301 to execute the various programs stored in the storage unit 304. More specifically, the ROM 302 stores, for example, a boot programs such as BIOS (Basic Input/Output System) and EFI (Extensible Firmware Interface).

The RAM 303 is a main storage device such as a DRAM (Dynamic Random Access Memory) and a SRAM (Static Random Access Memory). The RAM 303 functions as a work area that is used when the CPU 301 executes the various programs stored in the storage unit 304.

The storage unit 304 stores various programs to be executed by the CPU 301 and various databases that are used when the CPU 301 executes the various programs. The various databases include, for example, a proposal condition information database 153, an additional application information database 154, and a sheet information database 155.

The input unit 305 is a device for inputting various information to the data analysis server 150. The display unit 306 is a device for displaying various information included in the data analysis server 150.

The communication unit 307 is a device for communicating with the data collection server 140 and the information terminal 160 via the network 170.

Note that the hardware configuration of each of the data collection server 140 and the information terminal 160 is substantially the same as the above-described hardware configuration of the data analysis server 150. Thus, the description of the hardware configuration of each of the data collection server 140 and the information terminal 160 is omitted.

<4. Functional Configuration of Data Analysis Server>

Next, a functional configuration of the data analysis server 150 is described. Among the various functional units (e.g., proposal condition information generation unit 151, the proposal content output unit 152) that are implemented by the data analysis server 150, the functional configuration of the proposal condition information generation unit 151 is described.

Figure 4:
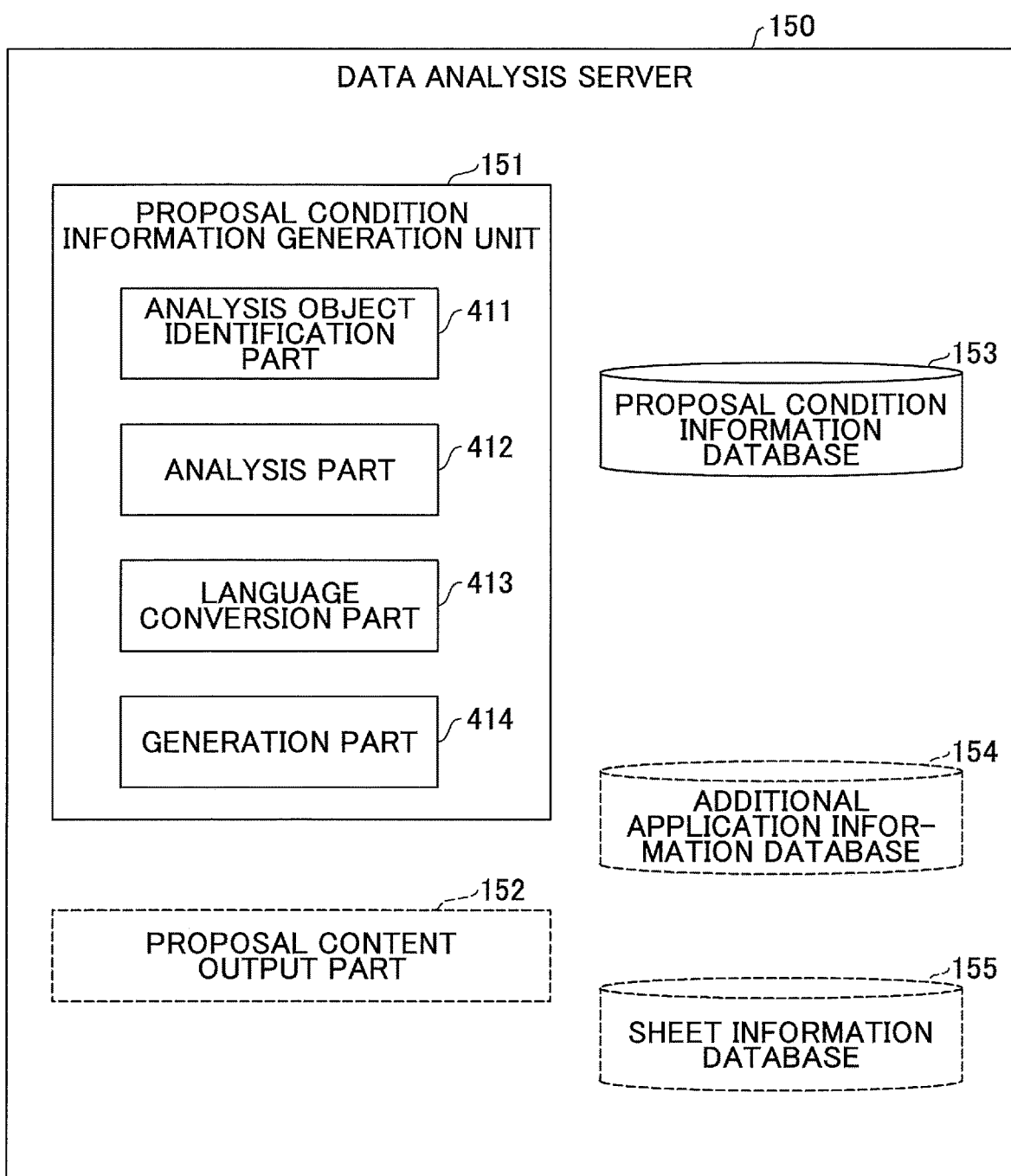
FIG. 4 is a schematic diagram illustrating a functional configuration of a data analysis server according to an embodiment of the present invention.

FIG. 4 is a schematic diagram illustrating a functional configuration of the data analysis server according to the first embodiment of the present invention. As illustrated in FIG. 4, the proposal condition information generation unit 151 includes an analysis object identification part 411, an analysis part 412, a language conversion part 413, and a generation part 414.

The analysis object identification part 411 identifies an image forming apparatus that is to be analyzed (target analysis object) in the proposal condition information generation phase. The analysis object identification part 411 identifies the target analysis object by referring to purchase result information. The target analysis object is an image forming apparatus having purchased an additional application and installed with the additional application.

The analysis part 412 obtains a proposal condition by analyzing collection information pertaining to the target analysis object identified by the analysis object identification part 411.

More specifically, the analysis part 412 recognizes a characteristic phenomenon (or characteristic phenomena) of an image forming apparatus by analyzing collection information pertaining to the image forming apparatus in a state before being installed with the additional application (second collection information). Further, the analysis part 412 obtains a proposal condition from among the recognized characteristic phenomena. The proposal condition obtained by the analysis part 412 is a characteristic phenomenon that is related to the purchase of the additional application.

Further, the analysis part 412 recognizes the characteristic phenomenon of the image forming apparatus of the target analysis object by analyzing other collection information pertaining to the image forming apparatus of the target analysis object in a state before being installed with the additional application (third collection information). Further, the analysis part 412 analyzes the characteristic phenomenon of the image forming apparatus by analyzing the collection information pertaining to the image forming apparatus in a state after being installed with the additional application (fourth collection information). Further, the analysis part 412 compares the characteristic phenomena and calculates the difference between the characteristic phenomena. Thereby, the analysis part 412 determines the effects attained by installing the additional application and generates effect information.

The language conversion part 413 converts the proposal condition obtained by the analysis part 412 into information of a language that can be understood by humans.

The generation part 414 generates proposal condition information. The term "proposal condition information" includes items "additional application", "proposal condition", "language conversion information" and "effect information" that are associated to each other. The generation part 414 stores the generation proposal condition information in the proposal condition information database 153.

<5. Processes of Proposal Condition Information Generation Phase>

Figure 5:
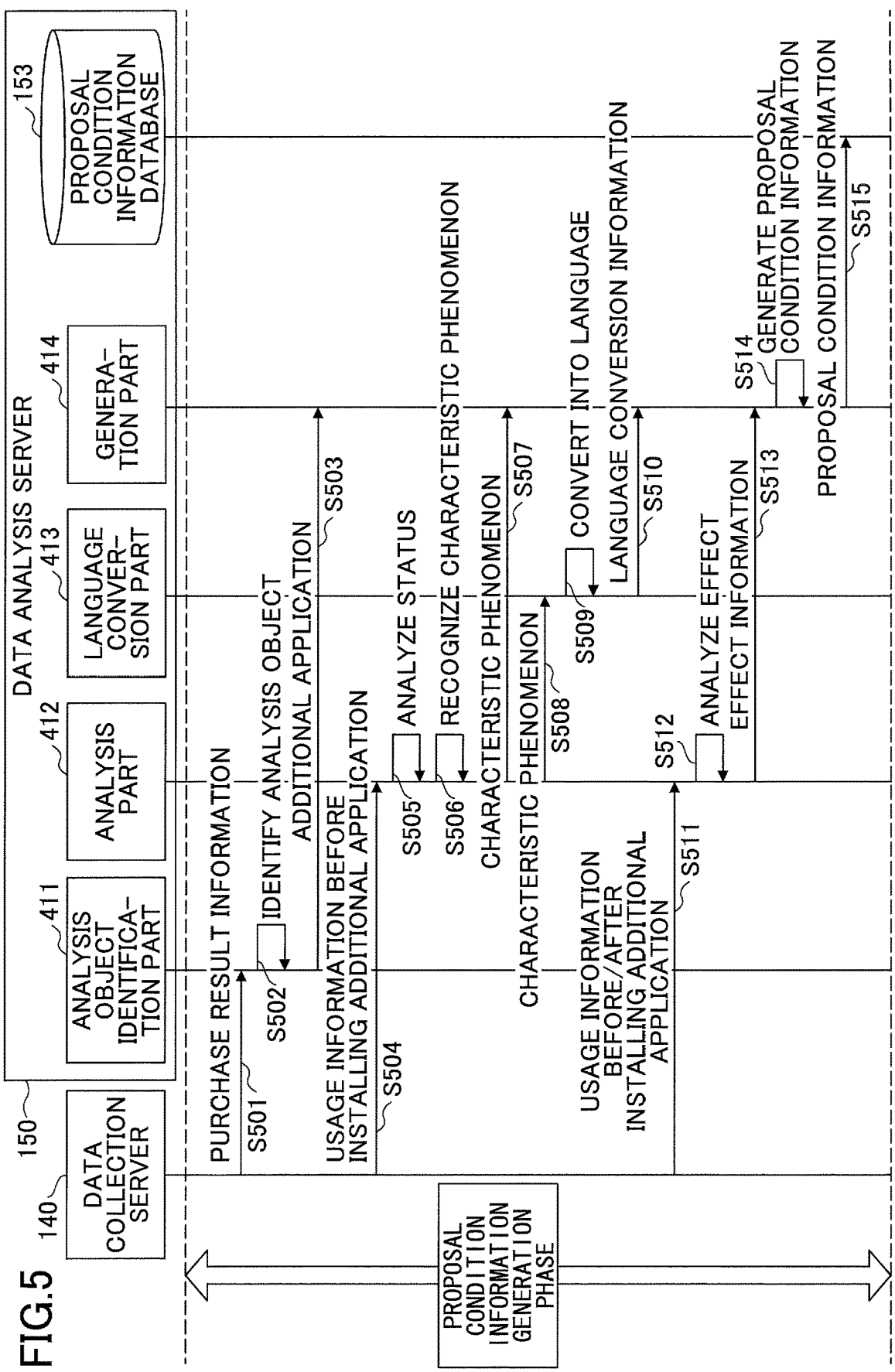
FIG. 5 is a sequence diagram illustrating a flow of the processes of a proposal condition generation phase according to an embodiment of the present invention.
Figure 6:
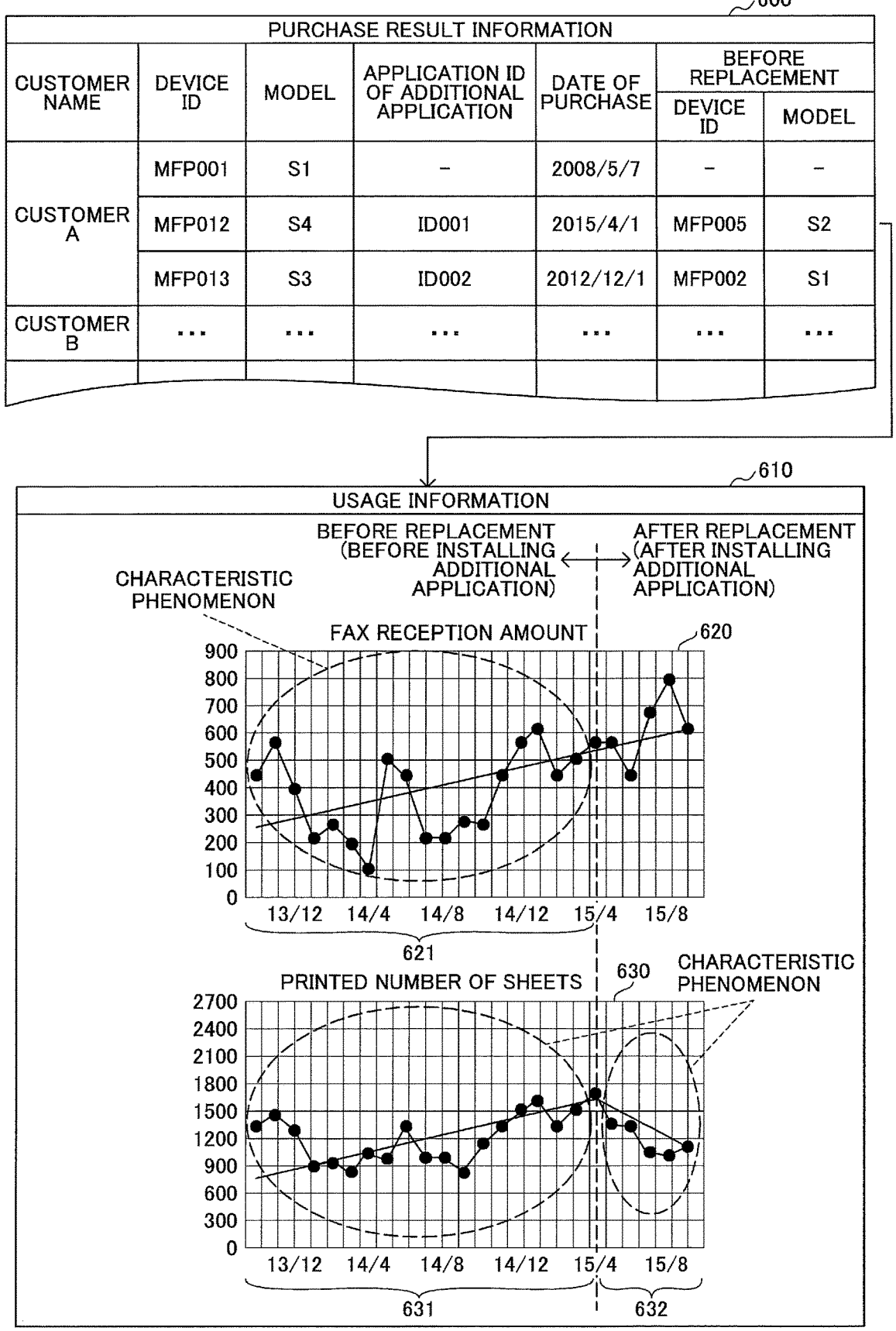
FIG. 6 is a schematic diagram illustrating purchase result information and usage information that are used in the processes of a proposal condition generation phase according to an embodiment of the present invention.

Next, the flow of the processes of the proposal condition generation phase is described with reference to FIGS. 5 and 6. FIG. 5 is a sequence diagram illustrating the flow of the processes of the proposal condition generation phase according to the first embodiment of the present invention. FIG. 6 is a schematic diagram illustrating purchase result information and usage information that are used in the processes of the proposal condition generation phase according to the first embodiment of the present invention.

As illustrated in FIG. 5, the analysis object identification part 411 obtains purchase result information from the data collection server 140. As illustrated in FIG. 6, the purchase result information 600 includes items such as "customer name", "device ID", "model", "application ID of additional application", "date of purchase", "device ID before replacement", and "model before replacement".

The first row of the purchase result information 600 indicates that "S1" is the model of the image forming apparatus having the device ID "MFP001" and being owned by "customer A", and that the image forming apparatus was purchased on "May 7, 2008". Note that the image forming apparatus has never been replaced after being purchased.

The second row of the purchase result information 600 indicates that "S4" is the model of the image forming apparatus having the device ID "MFP012" and being owned by "customer A", and that the image forming apparatus was purchased on "Apr. 1, 2015". Further, the second row of the purchase result information 600 indicates that the additional application having the device ID "ID001" was installed at the time of the purchase of the image forming apparatus. Further, the second row of the purchase result information 600 indicates that the image forming apparatus used before the replacement had a device ID "MFP005", and that the model of the image forming apparatus used before the replacement was "S4".

Returning to FIG. 5, the analysis object identification part 411 obtains the purchase result information 600 from the data collection server 140 in Step S501. In Step S502, the analysis object identification part 411 identifies the image forming apparatus that has purchased an additional application and installed the additional application thereto, so that the identified image forming apparatus (i.e., target analysis object) can be analyzed. According to the purchase result information 600, the analysis object identification part 411 identifies the image forming apparatuses having device IDs "MFP012", "MFP013" and being owned by the "customer A". In addition to identifying the image forming apparatuses "MFP012" and "MFP013", the analysis object identification part 411 also identifies image forming apparatuses "MFP005", "MFP002" that were used before being replaced by the image forming apparatuses "MFP012" and "MFP013". Thus, the identified image forming apparatuses "MFP005", "MFP002" are also target analysis objects.

Among the identified image forming apparatuses (target analysis objects), the analysis object identification part 411 reports the application ID of the additional application installed in the replaced image forming apparatuses (MFP012, MFP013) to the generation part 414 in Step S503. In the case of purchase result information 600, application IDs "ID001" and "ID002" are reported to the generation part 414.

Among the image forming apparatuses (target analysis objects) identified in Step S502, the analysis part 412 obtains the collection information of the image forming apparatuses "MFP005", "MFP002" used before replacement in Step S504. That is, the collection information obtained in Step S504 is collection information pertaining to the image forming apparatuses (target analysis objects) MFP005, MFP002 in the state before being installed with the additional application.

In the example of FIG. 6, the fax reception amount 620 of the usage information 610 is obtained as the collection information pertaining to the image forming apparatus (target analysis object) MFP005 in the state before being installed with the additional application (ID001). In FIG. 6, the data of the fax reception amount 620 during the period 621 is the usage information pertaining to the image forming apparatuses (target analysis objects) MFP005, MFP002 in the state before being installed with the additional application (ID001). It is to be noted that this usage information is usage information related to the purchasing of the additional application (ID001).

In Step S505, the analysis part 412 analyzes the data of the fax reception amount 620 during the period 621. In the example of FIG. 6, changes of the fax reception amount are analyzed by calculating the approximation straight line of the fax reception amount 620.

In Step S506, the analysis part 412 recognizes a characteristic phenomenon related to the purchasing of the additional application (ID001). More specifically, the recognized characteristic phenomenon is related to the purchasing of the additional application (ID001) and pertains to the image forming apparatus (target analysis object) MFP005 in the state before being installed with the additional application (ID001). In the example of FIG. 6, the characteristic phenomenon recognized by the analysis part 412 is that "the amount of fax reception is increasing".

In Step S507, the analysis part 412 reports the characteristic phenomenon recognized in Step S506 to the generation part 414. Further, in Step S508, the analysis part 412 reports the characteristic phenomenon recognized in Step S506 to the language conversion part 413.

In Step S509, the language conversion part 413 converts the reported characteristic phenomenon into information that can be understood by humans and generates language conversion information with the converted information. In the case where the characteristic phenomenon indicates that "the amount of fax reception is increasing", the language conversion part 413 generates language conversion information indicating that "communication inside/outside the company is performed by fax". Further, the language conversion part generates language conversion information indicating that "proposing digitalization for document storage is effective".

In Step S510, the language conversion part 413 reports the language conversion generated according to the reported characteristic phenomenon to the generation part 414.

In Step S511, the analysis part 412 collects other collection information pertaining to the status of each of the image forming apparatuses (target analysis objects) MFP005, MFP012, MFP002, MFP013 before and after installing the additional application to the image forming apparatuses (target analysis objects) MFP005, MFP012, MFP002, MFP013.

In the example of FIG. 6, the other collection information pertaining to the status of the image forming apparatus (target analysis object) MFP005 before installing the additional application (ID001) is the data of the usage information 610 indicating the number of sheets 630 printed during the period 631. Further, in the example of FIG. 6, the other collection information pertaining to the status of the image forming apparatus (target analysis object) MFP012 after installing the additional application (ID001) is the data of the usage information 610 indicating the number of sheets 630 printed during the period 632.

In Step S512, the analysis part 412 analyzes the obtained data indicating the number of printed sheets 630. In the example of FIG. 6, the analysis part 412 analyzes the change in the printed number of sheets by calculating the approximation straight line of the obtained data indicating number of printed sheets 630.

Note that the analysis part 412 performs analyzation by dividing the obtained data into data during the period 631 and data during the period 632. Thereby, the analysis part 412 can calculate the difference between the printed number of sheets before installing the additional application (ID001) and the printed number of sheets after installing the additional application (ID001). Further, the analysis part 412 determines the reduction effect of the printed number of sheets before and after installing the additional application (ID001) based on the calculated difference. Further, the analysis part 412 generates effect information according to the results of the determination.

In Step S513, the analysis part 412 reports the generated effect information to the generation part 414. The generation part 414 associates the following information to each other and generates proposal condition information including the associated information.

Application ID of additional application reported from the analysis object identification part 411 in Step S503

Characteristic phenomenon reported by the analysis part 412 in Step S507

Language conversion information reported from the language conversion part 413 in Step S510

Effect information reported from the analysis part 412 in Step S513

In Step S515, the generation part 414 stores the generated proposal condition information in the proposal condition information database 153.

<6. Description of Proposal Condition Information>

Next, proposal condition information generated by the proposal condition information generation part 151 is described. FIG. 7 is a schematic diagram illustrating the proposal condition information according to an embodiment of the present invention.

As illustrated in FIG. 7, the proposal condition information includes items such as "application ID", "characteristic phenomenon", "language conversion information", and "effect information".

The application ID (identifier for identifying the additional application) reported from the analysis object identification part 411 is stored in the item "application ID".

The characteristic phenomenon reported from the analysis part 412 is stored in the item "characteristic phenomenon". The language conversion information reported from the language conversion part 413 is stored in the item "language conversion information". The effect information reported from the analysis part 412 is stored in the item "effect information".

<7. Functional Configuration of Data Analysis Server>

Next, a functional configuration of the data analysis server 150 is described. Among the various functional units that are implemented by the data analysis server 150, the functional configuration of the proposal content output unit 152 is described.

Figure 8:
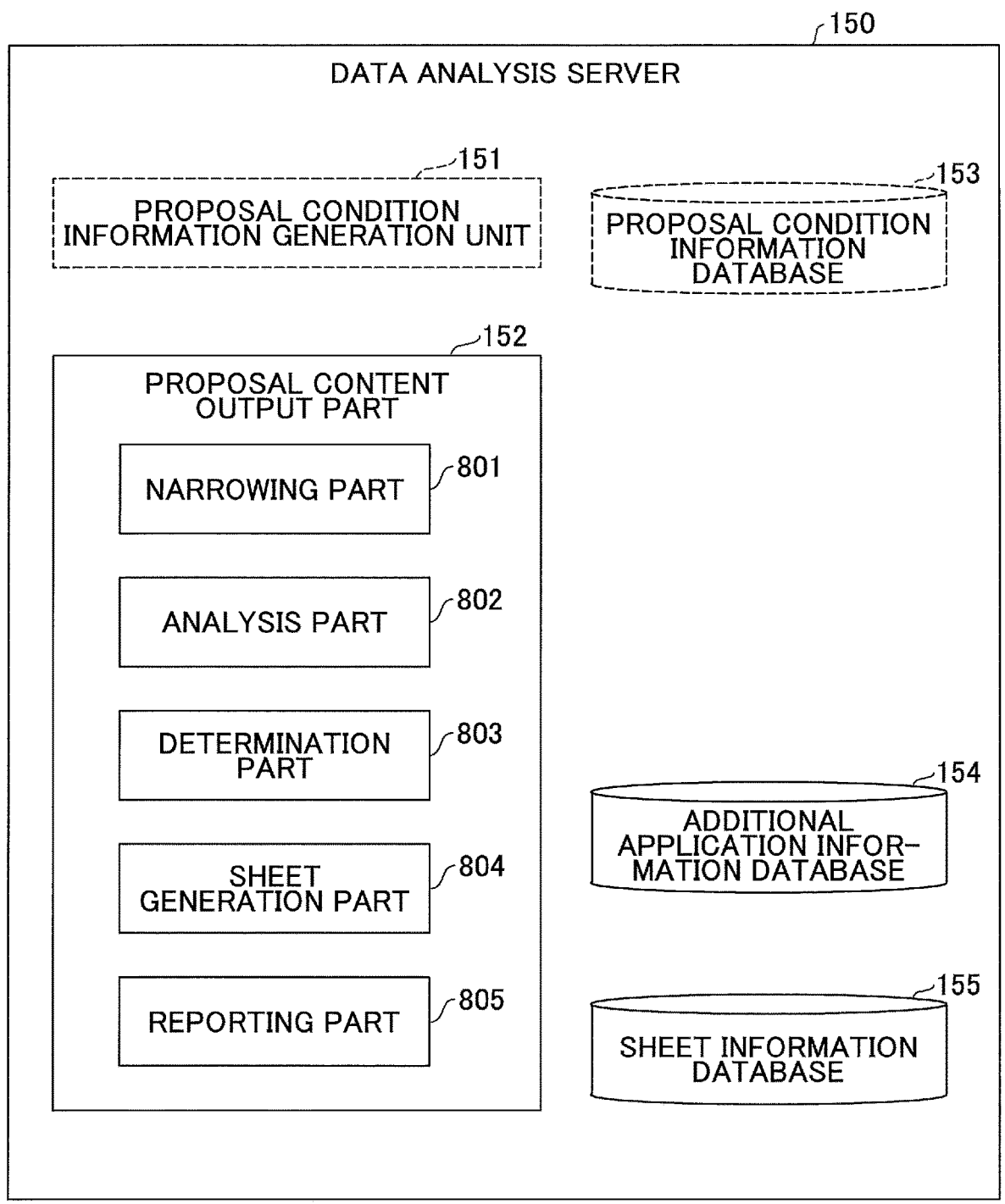
FIG. 8 is a schematic diagram illustrating a functional configuration of a data analysis server according to an embodiment of the present invention.

FIG. 8 is a schematic diagram illustrating the functional configuration of the data analysis server 150. As illustrated in FIG. 8, the proposal content output unit 152 includes a narrowing part 801, an analysis part 802, a determination part 803, a sheet generation part 804, and a reporting part 805.

The narrowing part 801 narrows down the image forming apparatuses for determining which image forming apparatuses should the installment of the additional application be proposed (target determination object). Among the image forming apparatuses that are managed (target management objects), the image forming apparatus that is subject to determination by the narrowing part 801 is the image forming apparatus that is determined to be in a time period for replacement. Accordingly, the narrowing part 801 identifies the image forming apparatus that is determined to be in a time period for replacement.

In addition, among the image forming apparatuses that are managed (target management objects), the image forming apparatus that is also subject to determination by the narrowing part 801 is the image forming apparatus that is determined to not be in a time period for replacement but is able to newly install the additional application. Accordingly, the narrowing part 801 identifies the image forming apparatus that is determined to not be in a time period for replacement but is able to newly install the additional application. Note that the narrowing part 801 determines whether the image forming apparatus (that is determined to not be in a time period for replacement) is able to install the additional application by referring to the additional application information database 154.

The analysis part 802 analyzes the collection information pertaining to the image forming apparatuses narrowed down for determination by the narrowing part 801 (first collection information) and recognizes a characteristic phenomenon. Note that the image forming apparatus narrowed down for determination is either an image forming apparatus that is determined to be in a time period for replacement or an image forming apparatus that is determined to not be in a time period for replacement but is able to install the additional application.

The determination part 803 refers to the proposal condition information of the proposal condition information database 153 and determines whether the characteristic phenomenon obtained by the analysis part 802 matches any of the "characteristic phenomenon" stored in the proposal condition information 700.

In a case where the characteristic phenomenon obtained by the analysis part 802 does not match any of the "characteristic information" stored in the proposal condition information 700, the determination part 803 determines that the image forming apparatus narrowed down for determination by the narrowing part 801 is not an image forming apparatus suitable for installing the additional application.

On the other hand, in a case where the characteristic phenomenon obtained by the analysis part 802 matches any of the "characteristic information" stored in the proposal condition information 700, the determination part 803 determines that the image forming apparatus narrowed down for determination by the narrowing part 801 is an image forming apparatus suitable for installing the additional application. In the case where the determination part 803 determines that the image forming apparatus is suitable for installing the additional application, the determination part 803 reports an output content to the sheet generation part 804. Note that the output content reported by the determination part 803 includes the following information.

Information indicating the image forming apparatus suitable for installing the additional application Proposal target (information indicating the customer that owns the image forming apparatus suitable for installing the additional application Collection information pertaining to the image forming apparatus (target determination object) that was analyzed when recognizing the characteristic phenomenon (mainly, usage information)

Proposal content (additional application identified by the "application ID" stored in association with the matching "characteristic phenomenon"

"Language conversion information" stored in association with the matching "characteristic phenomenon"

"Effect information" stored in association with the matching "characteristic phenomenon"

Note that the characteristic phenomenon obtained by the analysis part 802 and the "characteristic phenomenon" stored in the proposal condition information 700 are determined to match not only in a case where the characteristic phenomenon obtained by the analysis part 802 completely matches the "characteristic phenomenon" but also in a case where the characteristic phenomenon obtained by the analysis part 802 partially matches or is similar to the "characteristic phenomenon" stored in the proposal condition information 700.

Further, the additional application may be assigned with a priority order beforehand. Accordingly, in a case where multiple application IDs are stored in association with the matching "characteristic phenomenon", the determination part 803 identifies an additional application having the application ID having the highest priority order as the proposal content. The priority order of the additional application may be determined according to the purchase percentage of the additional application. For example, the additional applications may be sorted in a descending order according to purchase percentage.

The sheet generation part 804 obtains the output content to the determination part 803. Further, the sheet generation part 804 obtains a file from the application information database 154. The file is to be used for explaining the function of the proposal content (additional application). Further, the sheet generation part 804 adds the obtained file into the output content and generates a sheet including the output content.

<8. Description of Additional Application Information>

Next, the additional application information stored in the additional application database 154 is described. FIG. 9 is a schematic diagram illustrating the additional application information according to an embodiment of the present invention. As illustrated in FIG. 9, the additional application information includes items such as "application ID", "application name", "compatible model", and "function description file".

An identifier for identifying the additional application is stored in the item "application ID". A name of the additional application is stored in the item "application name".

A model (type) of image forming apparatus that can install the additional application is stored in the item "compatible model". An image forming apparatus of an old model may be unable to install the additional application. Therefore, with the additional application information 900, the types of image forming apparatuses that can install the additional application are managed. In this embodiment, the image forming apparatus of the newest type is assumed to be capable of installing any of the additional applications. The narrowing part 801 determines whether the additional application can be installed in the image forming apparatus by referring to the item "compatible type" of the additional application information 900.

A file for describing the function of the additional application identified by the application ID is stored in the item "function description file". The sheet generation part 804 reads out a file for describing a function of a proposal content from the item "function description file".

<9. Processes of Proposal Content Output Phase>

Figure 10:
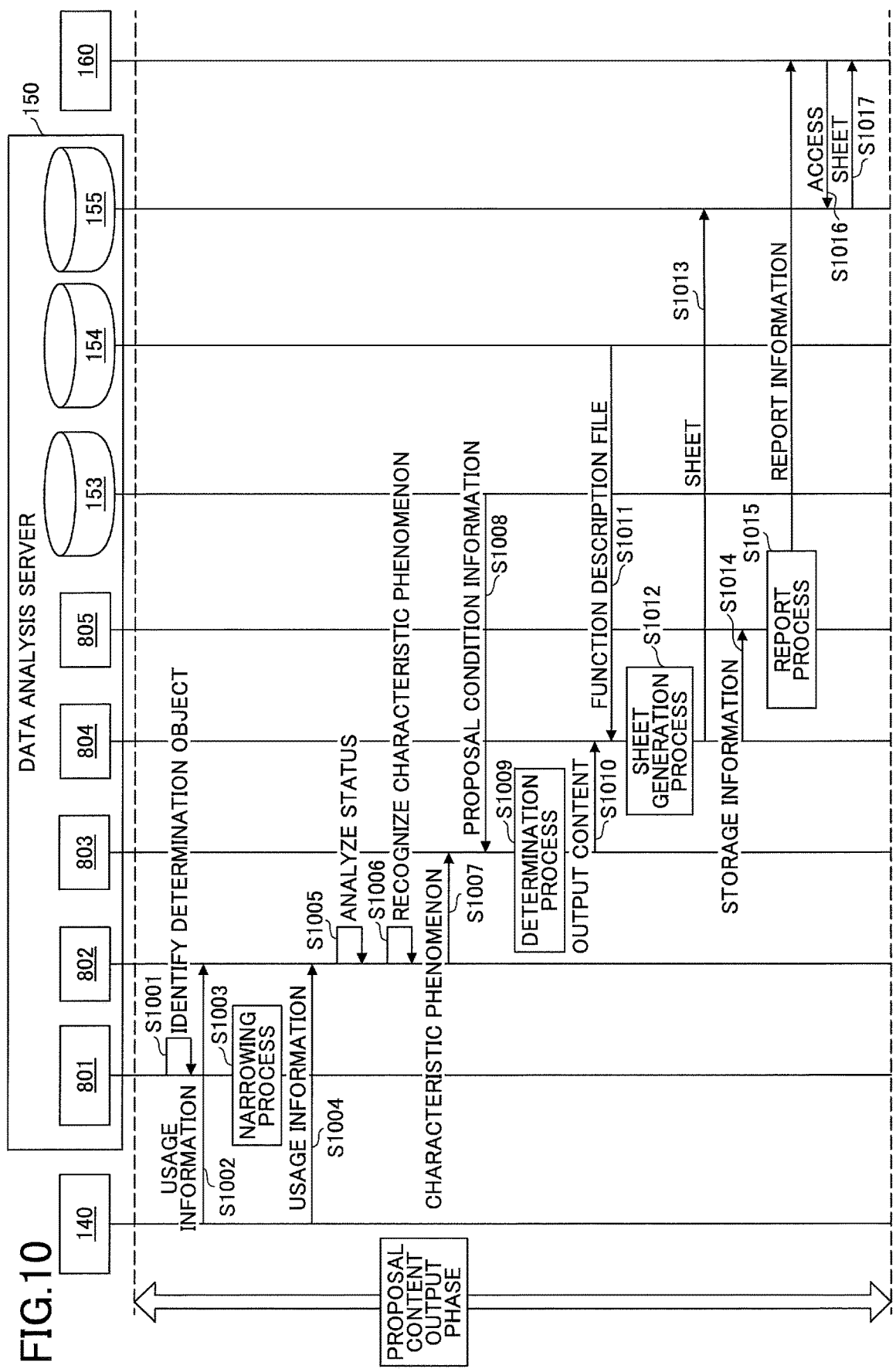
FIG. 10 is a sequence diagram illustrating a flow of the processes of a proposal content output phase according to an embodiment of the present invention.

Next, the flow of the processes of the proposal content output phase is described with reference to FIG. 10. FIG. 10 is a sequence diagram illustrating the flow of the processes of the proposal content output phase according to the first embodiment of the present invention. The processes illustrated in the sequence diagram of FIG. 10 are performed at a predetermined cycle (e.g., once every month).

In Step S1001, the narrowing part 801 narrows down the image forming apparatuses to be subject to determination (target determination objects) from the image forming apparatuses that are managed (target management objects) by determining the timing for replacing the image forming apparatuses.

In Step S1002, the analysis part 802 obtains collection information (mainly, usage information) pertaining to each of image forming apparatuses narrowed down in Step S1001 from the data collection server 140.

In Step S1003, the narrowing part 801 performs a narrowing process on the image forming apparatuses determined to not be in a time period for replacement based on whether the additional application can be installed in the image forming apparatuses. Thereby, the image forming apparatuses to be subject to determination are narrowed down. The narrowing process of Step S1003 is described in detail below.

According to the first embodiment, the timing for replacing the image forming apparatuses is determined, and then the image forming apparatuses are narrowed down to either an image forming apparatus that is determined to be in a time period for replacement or an image forming apparatus that is determined to not be in a time period for replacement but is able to install the additional application. Alternatively, all of the image forming apparatus that are managed may be subject to the determination of the capability of installing the additional application regardless of the timing for replacement. However, in most cases of determining the timing of replacing the image forming apparatuses, determining whether to install the additional application to the image forming apparatus is not necessarily required because the customer for proposing replacement (proposal target) tend to have an image forming apparatus of the newest model. However, whether to install the additional application to the image forming apparatus may be determined because the additional application may sometimes need to be installed even in a case where the image forming apparatus is not in the timing for replacement (e.g., a case where an application is not applicable to an image forming apparatus of an old model).

In Step S1004, the analysis part 802 obtains collection information (mainly, usage information) pertaining to the image forming apparatuses narrowed down in Step S1004 from the data collection server 140.

Figure 11:
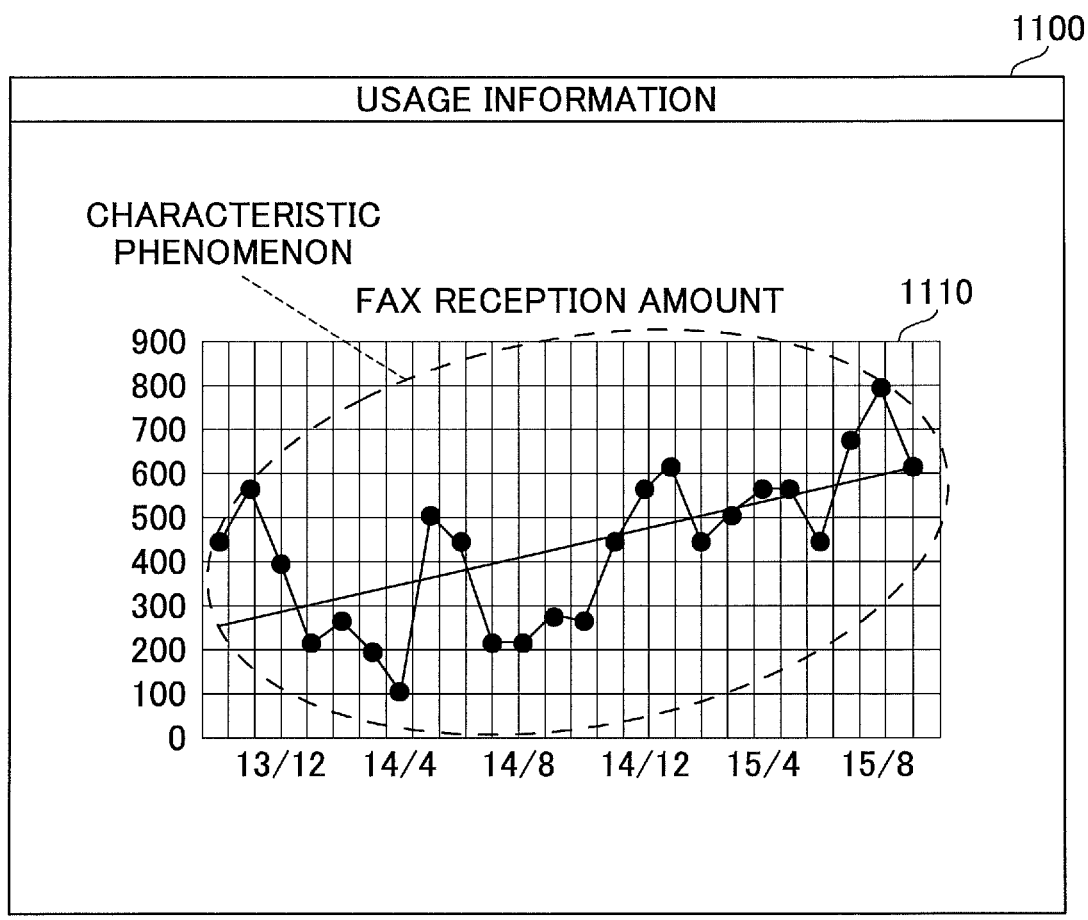
FIG. 11 is a schematic diagram illustrating usage information that is used in a proposal content output phase according to an embodiment of the present invention.

In Step S1005, the analysis part 802 analyzes each of the collection information (mainly, usage information) obtained in Steps S1002 and S1004. FIG. 11 is a schematic diagram illustrating the usage information that is used in the proposal content output phase according to an embodiment of the present invention. In the example illustrated in FIG. 11, the fax reception amount 1110 is analyzed as the usage information 1100 pertaining to the image forming apparatuses that are subject to determination (target determination objects).

In Step S1006, the analysis part 802 recognizes a characteristic phenomenon based on the analysis performed in Step S1005. In Step S1007, the analysis part 802 reports the recognized characteristic phenomenon to the determination part 803.

In Step S1008, the determination part 803 reads out the proposal condition information 700 from the proposal condition information database 153.

In Step S1009, the determination part 803 determines whether the characteristic phenomenon recognized in Step S1007 matches with any of the proposal conditions included in the proposal condition information 700 read out in Step S1008. Further, the determination part 803 retains an output content as a result of the determination. Note that the determination performed in Step S1009 is described in detail below.

In Step S1010, the determination part 803 reports the output content retained in Step S1009 to the sheet generation part 804.

In Step S1011, the sheet generation part 804 reads out a function description file corresponding to the proposal content (additional application) included in the output content from the additional application database 154.

In Step S1012, the sheet generation part 804 generates a sheet by performing a sheet generation process by using the output content reported in Step S1010 and the function description file read out in Step S1011. Note that the sheet generation process performed in Step S1012 is described in detail below.

In Step S1013, the sheet generation part 804 stores the generated sheet in the sheet information database 155. In Step S1014, the sheet generation part 804 reports storage information indicating the storage location of the generated sheet to the reporting part 805.

In Step S1015, the reporting part 805 performs a reporting process in which report information indicating the generation of the sheet is transmitted to the information terminal 160. Note that the reporting process performed by the reporting part 805 is described in detail below.

In Step S1016, the information terminal 160 that receives the report information transmitted in Step S1015 accesses the sheet information database 155. More specifically, the information terminal 160 accesses the storage location included in the report information.

In Step S1017, the information terminal 160 receives the sheet from the accessed storage location and displays the sheet.

<10. Details of Each Process of Proposal Content Output Phase>

Next, details of the each of the processes of the proposal content output phase (i.e., narrowing process (Step S1003), determination process (Step S1009), sheet generation process (Step S1012), reporting process (Step S1015)) are described.

(1) Details of Narrowing Process (Step S1003)

Figure 12:
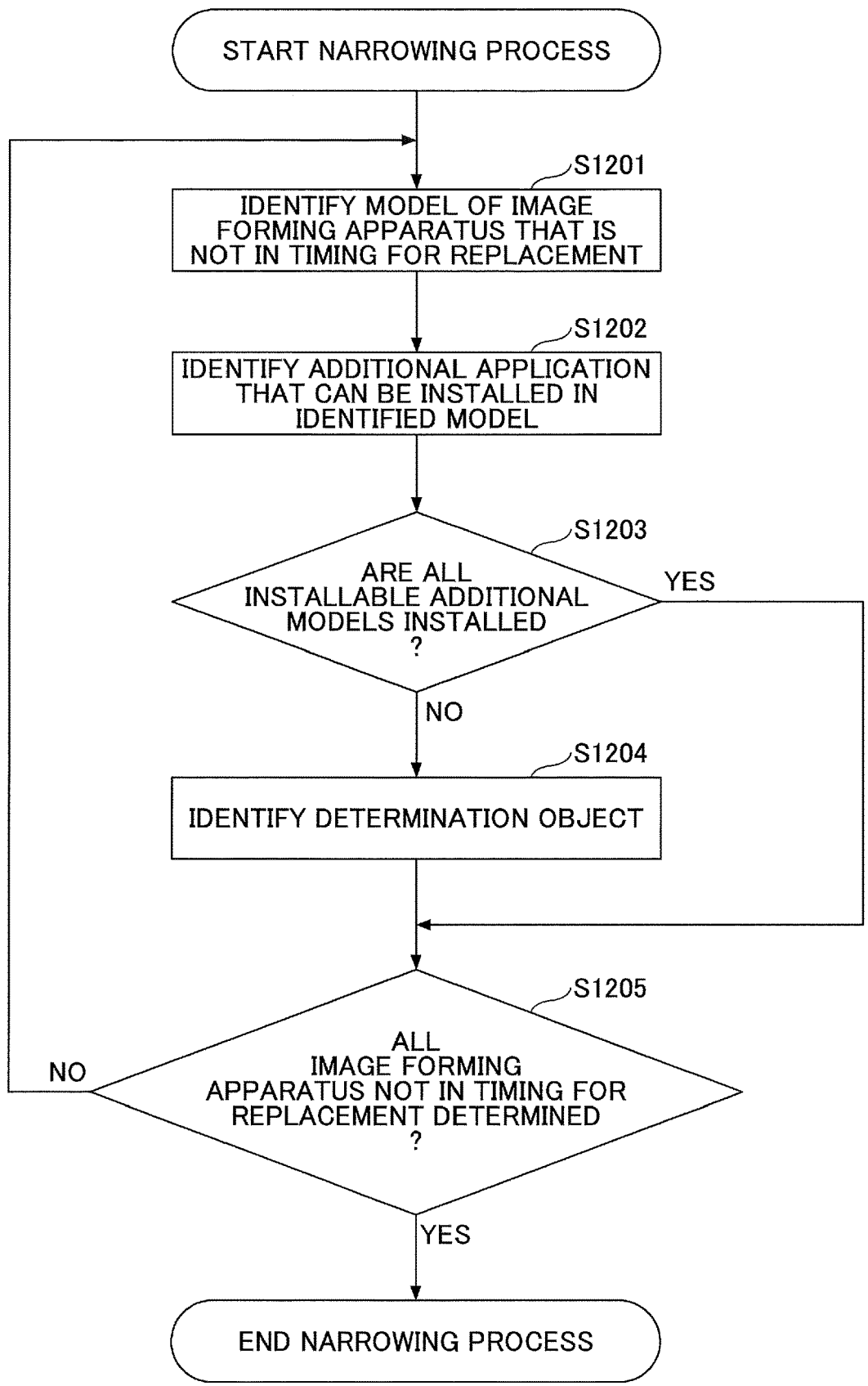
FIG. 12 is a flowchart illustrating a flow of a narrowing process according to an embodiment of the present invention.

FIG. 12 is a flowchart illustrating the flow of the narrowing process according to an embodiment of the present invention. Among the image forming apparatuses that are managed (target management objects), image forming apparatuses that are determined to not be in a time period for replacement are identified by the narrowing part 801 in Step S1201. More specifically, the narrowing part 801 identifies the type of each of the image forming apparatuses that are determined to not be in a time period for replacement.

In Step S1202, the narrowing part 801 identifies the additional application that can be installed (installable additional application) to the type of image forming apparatus identified in Step S1201. The narrowing part 801 identifies the additional application by referring to the additional application information 900.

In Step S1203, the narrowing part 801 determines whether all of the installable additional applications are installed in each of the image forming apparatuses that are determined to not be in a time period for replacement. In a case where all of the installable additional applications are determined to be installed in the identified image forming apparatuses (Yes in Step S1203), the narrowing process proceeds to Step S1205.

On the other hand, in a case where any one of the installable additional applications is determined to not be installed in the identified image forming apparatuses (No in Step S1203), the narrowing process proceeds to Step S1204.

In Step S1204, the image forming apparatus that is determined to not be installed with the installable additional application is identified as the target determination object (image forming apparatus subject to determination) by the narrowing part 801.

In Step S1205, the narrowing part 801 determines whether all of the image forming apparatuses that are determined to not be in a time period for replacement have been subject to the determination of whether the image forming apparatus is a target determination object. In a case where there is an image forming apparatus that has not been subject to the determination of whether the image forming apparatus is a target determination object (No in Step S1205), the narrowing process returns to Step S1201. On the other hand, the narrowing process is completed when all of the image forming apparatuses that are determined to not be in a time period for replacement have been subject to the determination of whether the image forming apparatus is a target determination object.

(2) Details of Determination Process (Step S1009)

Figure 13:
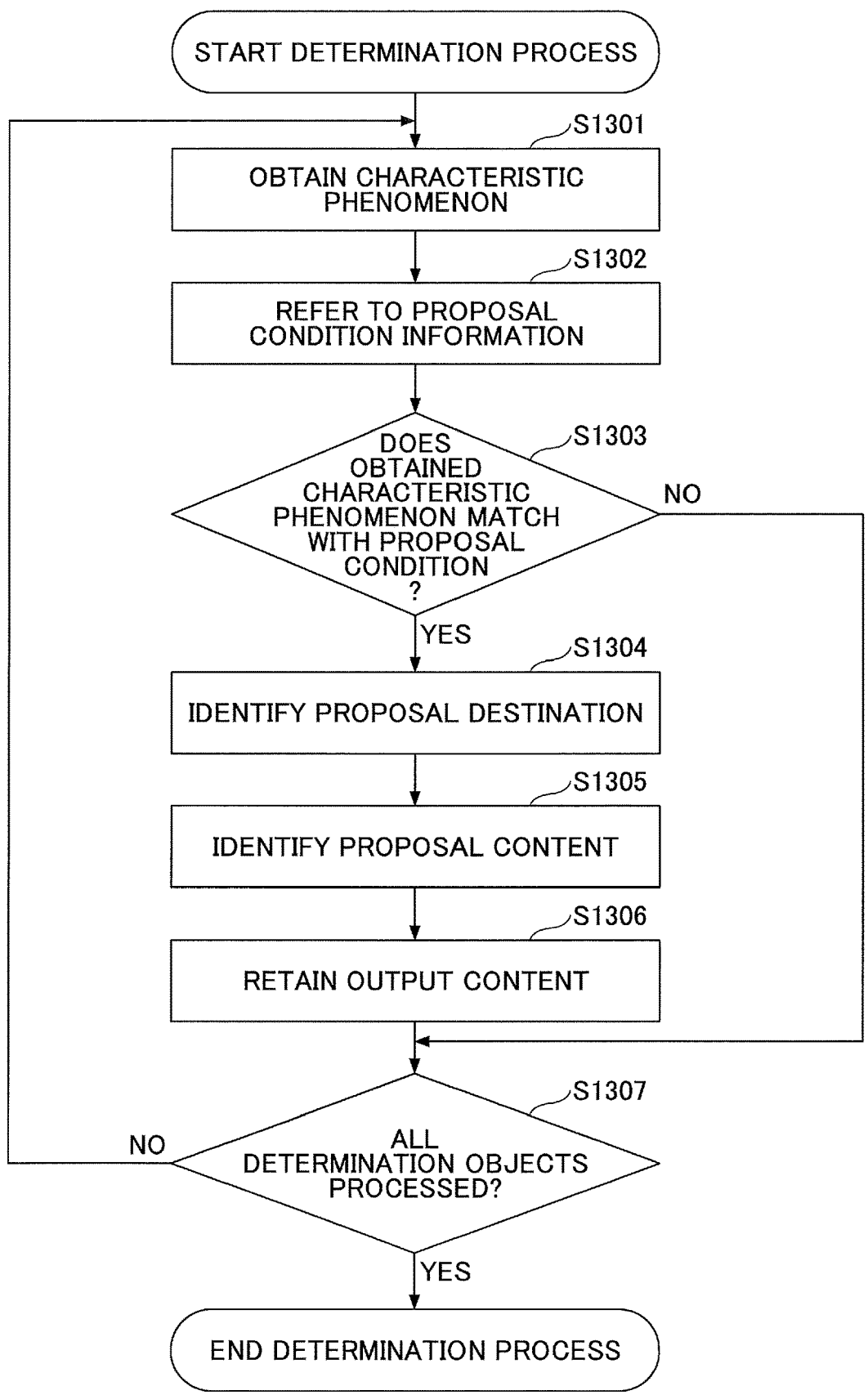
FIG. 13 is a flowchart illustrating a flow of a determination process according to an embodiment of the present invention.

FIG. 13 is a flowchart illustrating the flow of a determination process according to an embodiment of the present invention. In Step S1301, the determination part 803 obtains the characteristic phenomenon of the target determination objects (image forming apparatuses subject to determination) from the analysis part 802.

In Step S1302, the determination part 803 refers to the proposal condition information 700. In Step S1303, the determination part 803 determines whether the characteristic phenomenon obtained in Step S1301 matches any of the proposal conditions included in the proposal condition information 700. In a case where the characteristic phenomenon obtained in Step S1301 matches none of the proposal conditions included in the proposal condition information 700, the determination process proceeds to Step S1307.

On the other hand, in a case where the characteristic phenomenon obtained in Step S1301 matches any one of the proposal conditions included in the proposal condition information 700, the determination process proceeds to Step S1304. In Step S1304, the determination part 803 identifies the target determination object that matches the proposal condition. Further, the determination part 803 identifies the customer owning the identified target determination object to be the proposal target.

In Step S1305, the determination part 803 identifies a proposal content from the proposal condition information 700. The identified proposal content is the additional application having an application ID stored in association to the matching "characteristic phenomenon".

Further, in Step S1305, the determination part 803 obtains language conversion information stored in association to the matching "characteristic phenomenon" from the proposal condition information 700. Further, in Step S1305, the determination part 803 obtains effect information (prediction information) stored in association to the matching "characteristic phenomenon" from the proposal condition information 700. Further, in Step S1305, the determination part 803 obtains collection information analyzed by the analysis part 802 when recognizing the characteristic phenomenon (mainly, usage information). In Step S1306, the determination part 803 retains output content including information indicating the image forming apparatus, the proposal target, the proposal content, the language conversion information, the prediction information, the collection information (mainly, usage information).

In Step S1307, the determination part 803 determines whether the determination process has been performed on all of the target determination objects. In a case where the determination process has not been performed on all of the target determination objects, the determination process returns to Step S1301. On the other hand, in a case where the determination process is performed on all of the target determination objects, the determination process is completed.

(3) Details of Sheet Generation Process (Step S1012)

Figure 14:
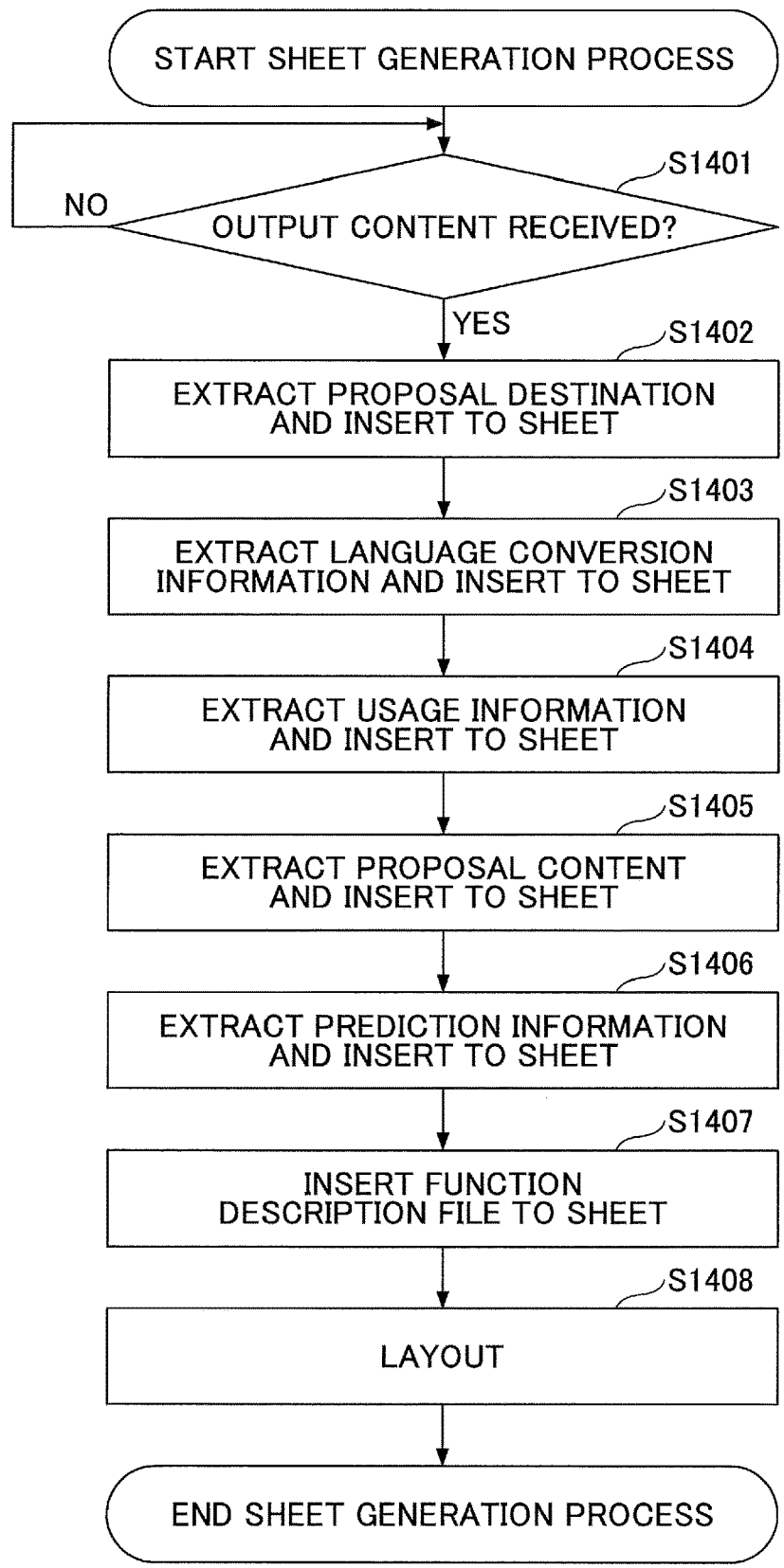
FIG. 14 is a flowchart illustrating a flow of a sheet generation process according to an embodiment of the present invention.
Figure 15:
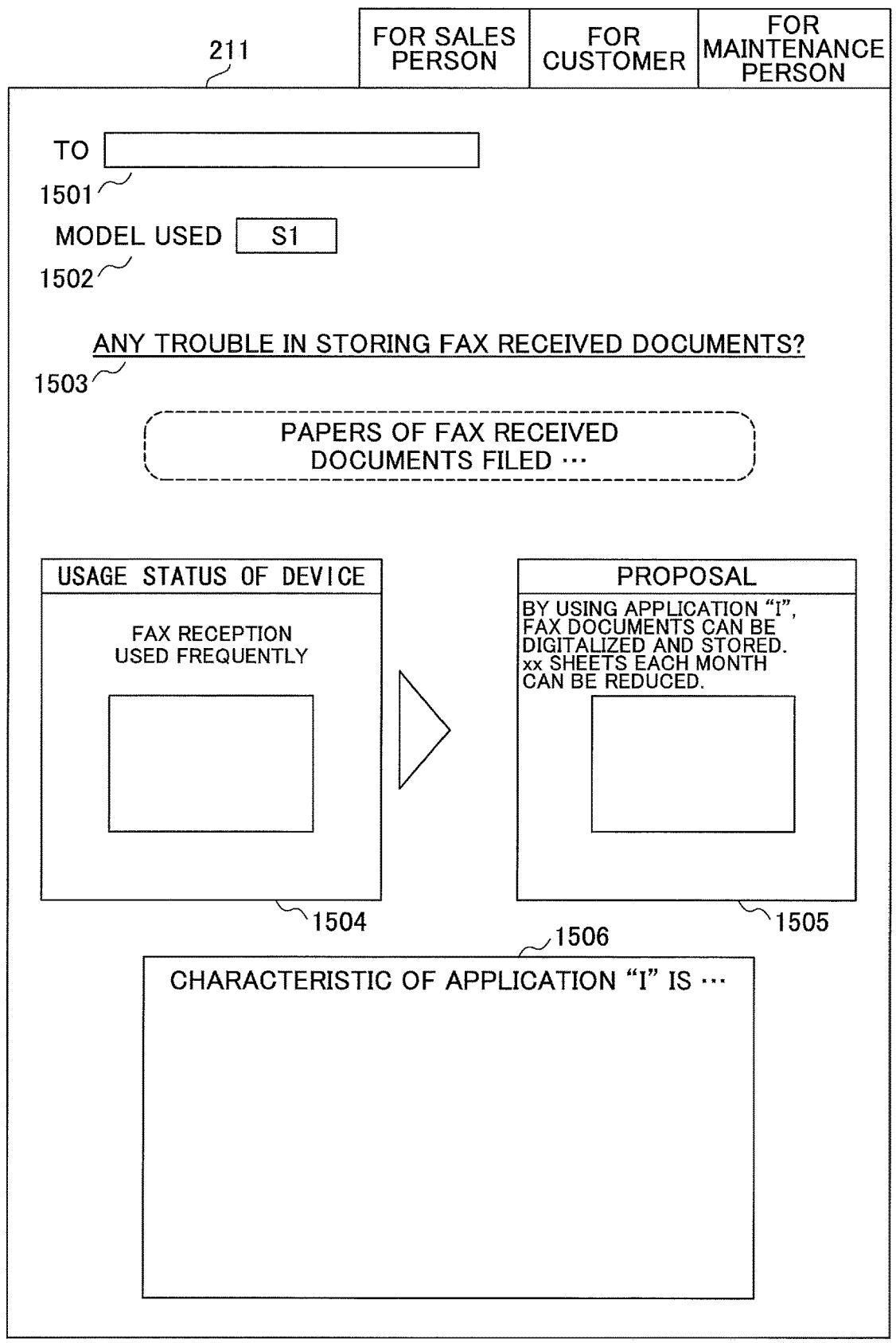
FIG. 15 is a schematic diagram illustrating a sheet according to an embodiment of the present invention.

Next, details of the sheet generation process are described with reference to FIGS. 14 and 15. FIG. 14 is a flowchart illustrating the flow of the sheet generation process according to an embodiment of the present invention. FIG. 15 is a schematic diagram illustrating a sheet according to an embodiment of the present invention.

In Step S1401, the sheet generation part 804 determines whether the output content from the determination part 803 is received. In a case where the sheet generation part 804 determines that the output content is not received, the sheet generation part 804 waits until the output content is received. On the other hand, in a case where the sheet generation part 804 determines that the output content is received, the sheet generation process proceeds to Step S1402.

In Step S1402, the sheet generation part 804 extracts the information indicating the proposal target and the image forming apparatus from the received output content. Further, the sheet generation part 804 inserts the extracted proposal target to a proposal target input column 1501 of the sheet 211 (See FIG. 15). Further, the sheet generation part 804 inserts the model of the image forming apparatus for proposing the installment of the additional application to a model input column 1502 of the sheet 211 based on the extracted information pertaining to the image forming apparatus.

In Step S1403, the sheet generation part 804 extracts the language conversion information included in the received output content. Further, the sheet generation part 804 inserts the extracted language conversion information to a language conversion column 1503 of the sheet 211. The sheet generation part 804 may insert the language conversion information as is (i.e., without further converting the language conversion information) to the language conversion column 1503 of the sheet 153 or further convert the language conversion information into an expression easier for the customer to understand and insert the further converted language conversion information to the language conversion column 153 of the sheet 211. Note that the language conversion information inserted to the language conversion input column may have a configuration that enables the language conversion information to be edited afterwards by the sales person.

In Step S1404, the sheet generation part 804 extracts the collection information (mainly, usage information) included in the received output information. Further, the sheet generation part 804 inserts the extracted collection information (mainly, usage information) to a collection information input column 1504 of the sheet 211. Note that the sheet generation part 804 may also insert (write) a characteristic phenomenon associated to the collection information when inserting the extracted collection information (mainly, usage information) to the collection information input column 1504.

In Step S1405, the sheet generation part 804 extracts the proposal content included in the received output content. Further, the sheet generation part 804 inserts the extracted proposal content to the proposal content/prediction information input column 1505 of the sheet 211.

In Step S1406, the sheet generation part 804 extracts the prediction information included in the received output content. Further, the sheet generation part 804 inserts the extracted prediction information to the proposal content/prediction information input column 1505 of the sheet 211.

In Step S1407, the sheet generation part 804 obtains the function description file corresponding to the proposal content from the additional application information database 154 and inserts the obtained function description file to the function description input column 1506 of the sheet 211.

In Step S1408, the sheet generation part 804 lays out the information inserted in Steps S1402 to S1407 and generates the sheet 211 indicating the inserted information.

The sheet generation part 804 may generate 3 types of sheets 211. The first type is for the sales person, the second type is for the customers, and the third type is for the maintenance person. The first type of sheet is used when the sales person performs sales activity. The second type of sheet is used when showing the customer information during the sales activity. The third type of sheet is carried and used by the maintenance person when the maintenance person performs maintenance activity. This is because the maintenance person may perform subsidiary sales activity in addition to maintenance activity.

The sheet 211 illustrated in FIG. 15 is a sheet for the sales person. The content of the information included in the sheet 211 of FIG. 15 is assumed to be different from the sheets for the customer and the maintenance person. For example, the function description file input to the function description input column 1506 for the maintenance person may be described more simply compared to the sheet for the sales person.

(4. Details of Reporting Process (Step s1015))

Figure 16:
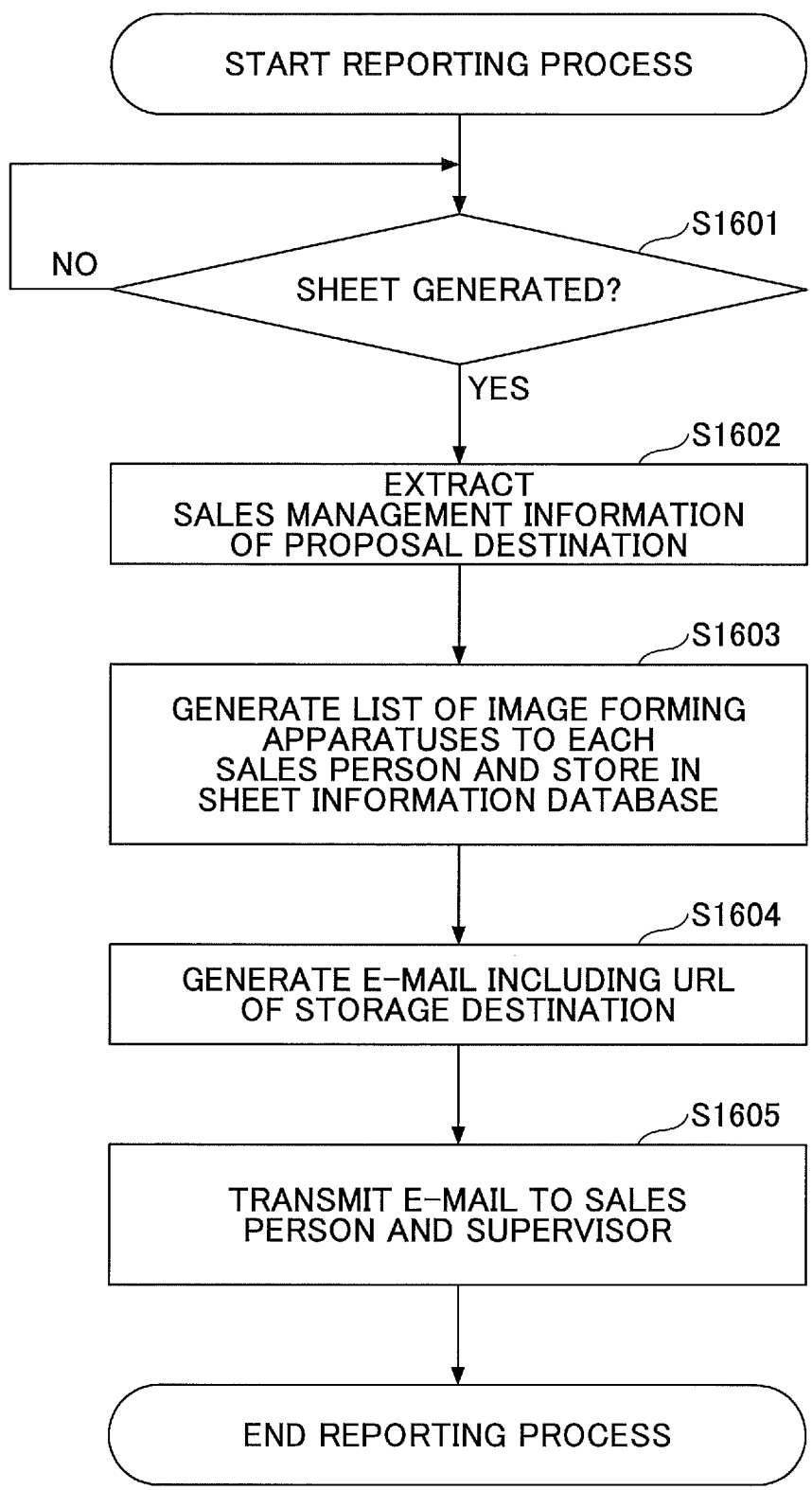
FIG. 16 is a flowchart illustrating a flow of a reporting process according to an embodiment of the present invention.

Next, the details of the reporting process (Step S1015) are described. FIG. 16 is a flowchart illustrating the flow of the reporting process according to an embodiment of the present invention.

In Step S1601, the reporting part 805 determines whether a sheet has been generated by the sheet generation part 804. In a case where the sheet is not generated (No in Step S1601), the reporting part 805 waits until generation of a sheet is determined.

On the other hand, in a case where the sheet is generated (Yes in Step S1601), the reporting process proceeds to Step S1602. In Step S1602, the reporting part 805 extracts sales management information of the proposal target (customer). Thereby, the reporting part 805 can identify the sales person that manages the image forming apparatuses of the proposal target (customer). The sales management information is recorded with information indicating the relationship between the sales person, the image forming apparatuses (target management objects) managed by the sales person, and the customer owning the image forming apparatuses. Accordingly, the recording part 805 reads out the sales person associated to the image forming apparatuses of the proposal target from the sales management information. Thereby, the reporting part 805 can identify the sales person managing the image forming apparatuses of the proposal target.

In Step S1603, the reporting part 805 generates a list of image forming apparatuses for proposing installment of the additional application. The list of image forming apparatuses is generated with respect to each sales person. The generated list of image forming apparatuses is stored in the sheet information database 155. Note that a storage location of the sheets (including the sheet for the sales person, the sheet for the customer, and the sheet for the maintenance person) generated by the sheet generation part is associated to the list of image forming apparatuses for proposing installment of the additional application.

In Step S1604, the reporting part 805 generates an electronic mail (e-mail) including the URL of the storage location. In Step S1605, the reporting part 805 transmits the generated e-mail addressed to the corresponding sales person and the supervisor of the sales person (e.g., superior of the sales person). The reason that the e-mail is transmitted not only to the sales person but also to the supervisor is because the supervisor of the sales person generally tends to decide the sales target of each sales person.

FIG. 17 is a schematic diagram illustrating a list of image forming apparatuses generated by the reporting part 805 (hereinafter also simply referred to as "list 170") according to an embodiment of the present invention. As illustrated in FIG. 17, the list 1700 is generated with respect to each sales person. The list 1700 includes items such as "obtain sheet", "time/date of report", "customer name", "office name", and "model".

The item "obtain sheet" includes a checkbox. When the checkbox is marked by the sales person, a sheet pertaining to the image forming apparatus for proposing the installment of the additional application can be read out from the sheet information database 155 and output. The time and date in which the report information is first transmitted from the report part 805 to the sales person is recorded in the item "time/date of report" of the list 1700.

The name of the customer owning the image forming apparatus for proposing the installment of the additional application is recorded in the item "customer name" of the list 1700. The name of the office having placed with the image forming apparatus for proposing the installment of the additional application is recorded in the item "office name" of the list 1700. The device ID for distinguishing the image forming apparatus for proposing the installment of the additional application is recorded in the item "device ID" of the list 1700. The model of the image forming apparatus for proposing the installment of the additional application is recorded in the item "model" of the list 1700.

In the case of the list 1700 illustrated in FIG. 17, there are two image forming apparatuses for proposing the installment of the additional application among the image forming apparatuses managed by the sales person. Accordingly, the sales person visits the customers A and B owning the image forming apparatuses, and performs sales activity by using the list.

Hence, according the support system 100 according to the above-described embodiment of the present invention, the support system 100 has a configuration of storing proposal condition information including proposal conditions for proposing installment of the additional application. Further, the support system 100 has a configuration of determining whether target management objects (managed image forming apparatuses) satisfy a proposal condition based on collected collection information (mainly, usage information) pertaining to the target management apparatuses. Further, the support system 100 has a configuration of outputting information indicating the target management apparatuses and information indicating the additional application stored in association to the proposal condition in a case where the target management apparatuses satisfy the proposal condition.

Accordingly, the sales person can recognize the additional application to be proposed and the image forming apparatus suitable for installing the additional application.

As a result, the sales person can make an appropriate proposal in the sales activity of the additional application. That is, the sales person's sales activity of the additional application can be supported.

Second Embodiment

In the above-described first embodiment, the collection information analyzed when obtaining the proposal condition (fax reception amount) is different from the collection information analyzed when determining the effect (number of sheets printed). Alternatively, the same kind of collection information may be analyzed.

In the above-described first embodiment, the image forming apparatus installed with the additional application is subject to analysis at the timing of replacement (see FIG. 6). Alternatively, the image forming apparatus installed with the additional application may be subject to analysis regardless whether the image forming apparatus is to be replaced.

In the above-described first embodiment, the data analysis server 150 includes the narrowing part 801, so that the narrowing part 801 narrows down the image forming apparatuses (target determination objects) from the managed image forming apparatuses (target management objects). Alternatively, the determination process may be performed on all of the target management instead of narrowing down the image forming apparatuses with the narrowing part 801.

In the above-described first embodiment, the information terminal 160 reads out the sheet stored in the sheet information database 155 and outputs the read out sheet as is without performing any process (e.g., editing) on the sheet. Alternatively, the information terminal 160 may read out the sheet stored in the sheet information database 155, edit the read out sheet, and output the edited sheet. Alternatively, the sheet information database 155 may store information to be inserted to the sheet instead of storing the generated sheet. Thereby, the information terminal 160 can download information to be inserted to the sheet and freely lay out (arranged) the downloaded information, so that the sheet can be generated according to the layout of the downloaded information.

Third Embodiment

According to the above-described first and second embodiments, the object to be managed (target management object) is an "image forming apparatus", and the product pertaining to the usage of the target management object is an "additional application". However, the combination of the target management object and the product pertaining to the usage of the target management object is not limited to the combination of an image forming apparatus and an additional application.

For example, the combination of the target management object and the product pertaining to the usage of the target management object may be an image forming apparatus and a peripheral device of the image forming apparatus. The peripheral device may be, for example, a personal computer or an electronic whiteboard. Alternatively, the product pertaining to the usage of the target management object may also be a device other than the peripheral device. That is, any product applies as long as the product has some relation to the image forming apparatus when the image forming apparatus is used. It is, however, to be noted that the product is to cause a change in the collection information pertaining to the image forming apparatus before the product is provided to the image forming apparatus and after the product is provided to the image forming apparatus. Further, there is to be some relationship between the collection information pertaining to the image forming apparatus before the product is provided and the purchasing of the product.

Further, the target management object is not limited to an image forming apparatus. For example, the target management object may be a vehicle. This is because usage information of the vehicle (e.g., mileage, stop position, traveling route) can be collected according to, for example, various sensor information measured by a navigation device or encoder mounted on the vehicle. In the case where the target management object is a vehicle, the product pertaining to the usage of the target management object may be, for example, a replaceable product constituting a part of the vehicle (e.g., studless tires) or an accessorial product of the vehicle (e.g., carrier). Accordingly, the support system may be utilized for proposing studless tires to a user that frequently travels to a snowy area or proposing ETC (Electronic Toll Collection) related devices to a user that frequently uses the highway. Further, the product pertaining to the usage of the target management object is not necessarily limited to a product that constitutes the vehicle. For example, a product related to the vehicle when the vehicle is used (e.g., ski insurance related to a case where the vehicle is used for a ski trip) is included in the product pertaining to the usage of the target management object.

The present invention is not limited to the specifically disclosed embodiments, and variations and modifications may be made without departing from the scope of the present invention.

The present application is based on and claims the benefit of priority Japanese Priority Application No. 2016-068331 filed on Mar. 30, 2016 with the Japanese Patent Office, the entire contents of which are hereby incorporated by reference.

What is claimed is:

1. A server apparatus comprising:
    a memory; and
    a processor coupled to the memory and configured to perform a process including:
        storing, in the memory, a proposal condition for proposing a product pertaining to a usage of an object in association with product information and language conversion information, the proposal condition representing a characteristic phenomenon of the object and used to determine whether to attain an effect by installing the product, the language conversion information acquired by converting information of the characteristic phenomenon into a language understandable by humans;
        determining whether one or more target management objects satisfy the proposal condition based on a first collection information including information pertaining to the one or more target management objects, said one or more target management objects including a target management object that has already installed the product and a target management object that has not installed the product; and
        outputting information indicating the one or more target management objects, the product information, and the language conversion information stored in association with the proposal condition upon determining that the one or more target management objects satisfy the proposal condition,
    wherein the process further includes identifying a target analysis object that has already installed the product among the one or more target management objects, and analyzing second collection information pertaining to a pre-installation state of the target analysis object, acquiring a first phenomenon information related to the purchasing of the product by analyzing the second collection information, storing the first phenomenon information as the proposal condition in association with the product in the memory, analyzing a change of a usage status of the target analysis object, to which the product has been installed, by computing a difference between usage information of the target analysis object before being installed with the product and usage information of the target analysis object after being installed with the product, determining a usage reduction effect acquired after the product was installed based on the change, and generating an effect information based on the usage reduction effect, and storing the effect information as the proposal condition in the memory.

2. The server apparatus as claimed in claim 1, wherein in a case where a second phenomenon information obtained by analyzing the first collection information is similar to the first phenomenon information stored as the proposal condition, the determining is configured to determine that the one or more target management objects are in a state that satisfy the proposal condition.

3. The server apparatus as claimed in claim 1, wherein the analyzing is configured to determine an effect attained by installing the product by comparing a third phenomenon information obtained by analyzing the second collection information pertaining to the target analysis object before being installed with the product and a fourth phenomenon information obtained by analyzing a third collection information pertaining to the target analysis object after being installed with the product, and wherein information indicating the effect is stored in association with the proposal condition in memory.

4. The server apparatus as claimed in claim 3, wherein in a case where the determining determines that the one or more target management objects are in a state that satisfy the proposal condition, the outputting is further configured to output the first collection information and the information indicating the effect.

5. The server apparatus as claimed in claim 4, wherein the process further includes generating a sheet including the information indicating the one or more target management objects and the product information.

6. The server apparatus as claimed in claim 5, wherein the generating of the sheet is configured to generate the sheet including the first collection information and the information indicating the effect.

7. A method that causes a computer of a server apparatus to execute a process, the process comprising:

storing, in a memory, a proposal condition for proposing a product pertaining to a usage of an object and product information indicating the product, the proposal condition is stored in association with the product information;

determining whether one or more target management objects satisfy the proposal condition based on a first collection information including information pertaining to the one or more target management objects, said one or more target management objects including a target management object that has already installed the product and a target management object that has not installed the product; and outputting information indicating the one or more target management objects and the product information stored in association with the proposal condition when the one or more target management objects satisfy the proposal condition, wherein the process further includes identifying a target analysis object that has already installed the product among the one or more target management objects, and analyzing second collection information pertaining to a pre-installation state of the target analysis object, acquiring a first phenomenon information related to the purchasing of the product by analyzing the second collection information, storing the first phenomenon information as the proposal condition in association with the product in the memory, analyzing a change of a usage status of the target analysis object, to which the product has been installed, by computing a difference between usage information of the target analysis object before being installed with the product and usage information of the target analysis object after being installed with the product, determining a usage reduction effect acquired after the product was installed based on the change, and generating an effect information based on the usage reduction effect, and storing the effect information as the proposal condition in the memory.

8. A computer program product for causing a computer to execute a process, the process comprising:

storing, in a memory, a proposal condition for proposing a product pertaining to a usage of an object and product information indicating the product, the proposal condition is stored in association with the product information;

determining whether one or more target management objects satisfy the proposal condition based on a first collection information including information pertaining to the one or more target management objects, said one or more target management objects including a target management object that has already installed the product and a target management object that has not installed the product; and outputting information indicating the one or more target management objects and the product information stored in association with the proposal condition when the one or more target management objects satisfy the proposal condition, wherein the process further includes identifying a target analysis object that has already installed the product among the one or more target management objects, and analyzing second collection information pertaining to a pre-installation state of the target analysis object, acquiring a first phenomenon information related to the purchasing of the product by analyzing the second collection information, storing the first phenomenon information as the proposal condition in association with the product in the memory, analyzing a change of a usage status of the target analysis object, to which the product has been installed, by computing a difference between usage information of the target analysis object before being installed with the product and usage information of the target analysis object after being installed with the product, determining a usage reduction effect acquired after the product was installed based on the change, and generating an effect information based on the usage reduction effect, and storing the effect information as the proposal condition in the memory.

* * * * *